US012219509B2

(12) United States Patent
Takeda et al.

(10) Patent No.: US 12,219,509 B2
(45) Date of Patent: Feb. 4, 2025

(54) SECONDARY CELL ACTIVATION USING TEMPORARY REFERENCE SIGNALS

(71) Applicant: QUALCOMM INCORPORATED, San Diego, CA (US)

(72) Inventors: Kazuki Takeda, Tokyo (JP); Changhwan Park, San Diego, CA (US); Heechoon Lee, San Diego, CA (US); Alberto Rico Alvarino, San Diego, CA (US); Peter Gaal, San Diego, CA (US); Juan Montojo, San Diego, CA (US); Wanshi Chen, San Diego, CA (US); Tao Luo, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/450,073

(22) Filed: Aug. 15, 2023

(65) Prior Publication Data
US 2023/0397136 A1 Dec. 7, 2023

Related U.S. Application Data

(63) Continuation of application No. 17/491,400, filed on Sep. 30, 2021, now Pat. No. 11,778,574.
(Continued)

(51) Int. Cl.
*H04W 56/00* (2009.01)
*H04L 5/00* (2006.01)
*H04W 72/23* (2023.01)

(52) U.S. Cl.
CPC ......... *H04W 56/001* (2013.01); *H04L 5/0051* (2013.01); *H04W 72/23* (2023.01)

(58) Field of Classification Search
CPC ... H04W 56/001; H04W 72/23; H04W 76/15; H04L 5/0051; H04L 27/2602;
(Continued)

(56) References Cited

U.S. PATENT DOCUMENTS

| 10,003,986 B2 | 6/2018 | Liu et al. |
| 2022/0116896 A1 | 4/2022 | Takeda et al. |
| 2022/0116976 A1* | 4/2022 | Nory ...................... H04L 5/001 |

OTHER PUBLICATIONS

International Preliminary Report on Patentability—PCT/US2021/053119—The International Bureau of WIPO—Geneva, Switzerland—Apr. 20, 2023.
(Continued)

*Primary Examiner* — Kyaw Z Soe
(74) *Attorney, Agent, or Firm* — Haynes and Boone, LLP

(57) ABSTRACT

Systems, methods, and devices for secondary cell activation using temporary reference signals are provided. In one aspect, a method of wireless communication performed by a user equipment (UE), includes receiving, from a base station (BS) via a first cell, an activation command to activate a second cell different from the first cell, and receiving, from the BS via the second cell during an activation period, a first reference signal different from a synchronization signal block (SSB). The method further includes performing a measurement of the first reference signal, and operating in the second cell based on the measurement. In some aspects, using reference signals different from SSBs may reduce the delay associated with activating the secondary cell.

27 Claims, 15 Drawing Sheets

Related U.S. Application Data

(60) Provisional application No. 63/198,312, filed on Oct. 9, 2020.

(58) Field of Classification Search
CPC ... H04L 5/0048; H04L 5/0098; H04L 27/261; H04L 5/0035; H04L 5/001; H04L 5/0023
See application file for complete search history.

(56) References Cited

OTHER PUBLICATIONS

International Search Report and Written Opinion—PCT/US2021/053119—ISA/EPO—Feb. 3, 2022.
Mediatek Inc: "Efficient and Low Latency SCell Data Transmission for NR CA", 3GPP TSG RAN WG1 Meeting RAN1 #98-Bis, R1-1911062, Efficient and Low Latency Scell Data Transmission for NR CA_Oct. 4, 2019_Final, 3rd Generation Partnership Project, Mobile Competence Centre, 650, Route Des Lucioles, F-06921, vol. RAN WG1, No. Chongqing, China, Oct. 14, 2019-Oct. 20, 2019, 19 Pages, Oct. 5, 2019, XP051789842, p. 7, paragraph 3, p. 15, paragraph 4, figures 3-9.
ZTE Corporation, et al., "On Delay Reduction of SCell Activation", 3GPP Draft, 3GPP TSG-RAN WG2 Meeting #106, R2-1907097 on Delay Reduction of Scell Activation, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019 May 3, 2019 (May 3, 2019), XP051711394, 5 Pages, pp. 1-3.

\* cited by examiner

SECONDARY CELL ACTIVATION USING TEMPORARY REFERENCE SIGNALS

CROSS-REFERENCE TO RELATED APPLICATIONS

The present application for patent is a continuation of patent application Ser. No. 17/491,400, entitled "SECONDARY CELL ACTIVATION USING TEMPORARY REFERENCE SIGNALS", filed Sep. 30, 2021, pending, and assigned to the assignee hereof, which claims the benefit of and priority to U.S. Provisional Application Ser. No. 63/198,312, entitled "SECONDARY CELL ACTIVATION USING TEMPORARY REFERENCE SIGNALS", filed on Oct. 9, 2020, and assigned to the assignee hereof, the entire content of each of which is expressly incorporated by reference herein.

TECHNICAL FIELD

This application relates to wireless communication systems, and more particularly to secondary cell activation in a carrier aggregation system.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Carrier aggregation (CA) is a capability, for example, in LTE and 5G NR, in which two or more frequency bands or component carriers (CCs) can be combined to increase bandwidth. In some aspects, one CC may be used as an anchor carrier or a primary cell (Pcell) and another CC may be used as a supplemental carrier or a secondary cell (Scell). The Scell may include an uplink (UL) component carrier and a downlink (DL) component carrier. Alternatively, the Scell may include a DL component carrier only. In CA communication scenarios, a BS may activate an Scell for communication with a UE as needed, for example, based on traffic loading and/or channel conditions. The activation may include the UE performing measurements of signal synchronization blocks (SSBs) transmitted by the BS on the Scell. Once activated, the Scell can be used for scheduling DL and/or UL data transmissions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS) via a first cell, an activation command to activate a second cell different from the first cell; receiving, from the BS via the second cell during an activation period, a first reference signal different from a synchronization signal block (SSB); performing a measurement of the first reference signal; and operating in the second cell based on the measurement.

According to another aspect of the present disclosure, a method of wireless communication performed by a base station (BS) includes: transmitting, to a user equipment (UE) via a first cell, an activation command to activate a second cell different from the first cell; transmitting, to the UE via the second cell during an activation period, a first reference signal different from a synchronization signal block (SSB); receiving, from the UE, a measurement report; and operating in the second cell in response to receiving the measurement report.

According to one aspect of the present disclosure, a user equipment (UE) includes: a transceiver configured to: receive, from a base station (BS) via a first cell, an activation command to activate a second cell different from the first cell; and receive, from the BS via the second cell during an activation period, a first reference signal different from a synchronization signal block (SSB). The UE further includes a processor configured to: perform a measurement of the first reference signal; and operate in the second cell based on the measurement.

According to another aspect of the present disclosure, a base station (BS) includes: a transceiver configured to: transmit, to a user equipment (UE) via a first cell, an activation command to activate a second cell different from the first cell; transmit, to the UE via the second cell during an activation period, a first reference signal different from a synchronization signal block (SSB); and receive, from the UE, a measurement report. The BS further includes a processor configured to operate in the second cell in response to receiving the measurement report.

According to one aspect of the present disclosure, a non-transitory computer-readable medium has program code recorded thereon, the program code comprising: code for causing a UE to receive, from a BS via a first cell, an activation command to activate a second cell different from the first cell; code for causing the UE to receive, from the BS via the second cell during an activation period, a first reference signal different from a synchronization signal block (SSB); code for causing the UE to perform a measurement of the first reference signal; and code for causing the UE to operate in the second cell based on the measurement.

According to another aspect of the present disclosure, a non-transitory computer-readable medium has program code recorded thereon, the program code comprising: code for causing the BS to transmit, to a UE via a first cell, an activation command to activate a second cell different from the first cell; code for causing the BS to transmit, to the UE via the second cell during an activation period, a first reference signal different from a synchronization signal block (SSB); code for causing the BS to receive, from the UE, a measurement report; and code for causing the BS to operate in the second cell in response to receiving the measurement report.

According to one aspect of the present disclosure, a UE includes: means for receiving, from a BS via a first cell, an activation command to activate a second cell different from the first cell; means for receiving, from the BS via the second cell during an activation period, a first reference signal different from a synchronization signal block (SSB); means for performing a measurement of the first reference signal; and means for operating in the second cell based on the measurement.

According to another aspect of the present disclosure, a BS includes: means for transmitting, to a UE via a first cell, an activation command to activate a second cell different from the first cell; means for transmitting, to the UE via the second cell during an activation period, a first reference signal different from a synchronization signal block (SSB); means for receiving, from the UE, a measurement report; and means for operating in the second cell in response to receiving the measurement report.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
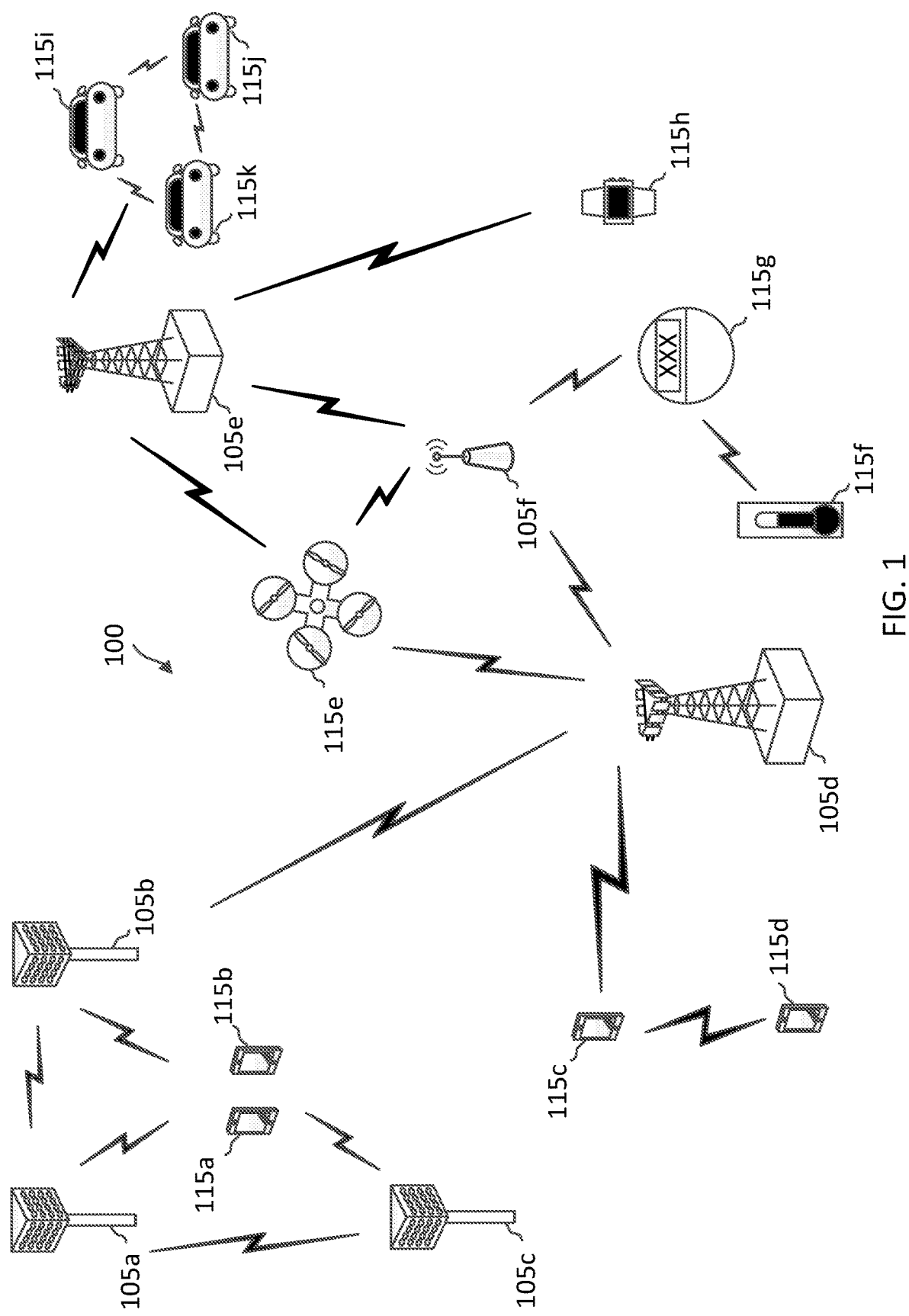
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In some aspects, 5G NR may be described as operating in two frequency ranges: FR1, which includes frequency bands of about 7 GHz and lower (e.g., 410 MHz to 7125 MHz), and FR2, which includes frequency bands between about 24.25 GHz and about 52.6 GHz, which may be referred to as the mmWave.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In order to transfer data at a higher rate, a UE and a BS may communicate over multiple frequency bands in parallel (a form of carrier aggregation (CA)). In this configuration, one of the bands can be associated with a primary cell (Pcell) and another with a secondary cell (Scell). In some aspects, a UE communicating with a BS over a single Pcell, or anchor cell, may activate an Scell for CA by receiving an activation command from the BS over the Pcell, and performing measurements of SSBs transmitted on the Scell. SSBs include reference signals, such as primary synchronization signals (PSS), secondary synchronization signal (SSS), and demodulation reference signals (DM-RS). The UE can perform measurements of the reference signals to perform various functions to establish and maintain communication over a given cell, such as automatic gain control (AGC), frequency tracking, time tracking, and cell detection. SSBs are detected and used by UEs during cell search and activation procedures to activate a cell. SSBs are transmitted via the Scell with an SSB periodicity, which may be one SSB or SSB burst every 20 ms, 40 ms, 80 ms, or any suitable periodicity. The relatively sparse SSBs in the Scell increase the delay from the time the UE receives the Scell activation command to the time the Scell is activated for operation. For example, if a UE receives an Scell activation command after or shortly before (e.g., <2 ms before) an SSB is transmitted, the UE waits for a full SSB period (e.g., 20 ms) before the UE can perform the measurements involved with the cell activation. The increased delay to activate an Scell for CA can result in suboptimal performance and user experience.

As used herein, the terms "temporary reference signals (RSs)" may refer to a reference signal that is not part of an SSB and is scheduled for temporary use, for example, to assist a UE in performing AGC and/or fine tracking (e.g., time and/or frequency tracking) during cell activation. The temporary aspect may refer to one or more schedule instances within an activation duration of a cell (e.g., an Scell), and may not be present after the cell is activated.

Aspects of the present disclosure provide mechanisms for activating an Scell by detecting and measuring one or more temporary reference signals (RSs), such as tracking reference signals (TRS) and/or non-zero-power channel state information reference signals (NZP-CSI-RS). Temporary RSs can be transmitted more frequently than SSBs, in some aspects. The temporary RSs can be used in place of the SSBs by UEs for AGC and/or fine tracking (including time and/or frequency tracking). The temporary RSs can be triggered by the BS, and may be associated with or based on an activation command to activate the Scell. The BS may indicate to the UE the timing (e.g., slot number) and configuration of the temporary RS in downlink information, such as a downlink control information (DCI) in a physical downlink control channel (PDCCH), or a media access control control element (MAC-CE) in a physical downlink shared channel (PDSCH). By triggering one or more temporary RSs associated with an Scell activation command, and indicating the triggering to the UE, the delay associated with activating the Scell can be reduced, and the BS and UE can begin operation on the Scell sooner, thereby improving performance and user experience. Further, indicating the temporary RSs to the UE in a PDCCH or PDSCH, such as the PDSCH that carries the Scell activation command may provide an efficient scheme for coordinating the Scell activation. The mechanisms described herein may be used in either FR1 or PR2, but may be particularly applicable to frequency bands within FR1.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may be an NR network supporting carrier aggregation (CA) of component carriers (CCs) in which more than one cell can be activated to support DL/UL transmissions. Each cell may correspond to a different CC, and may be within a same frequency band or within different frequency bands.

Figure 2:
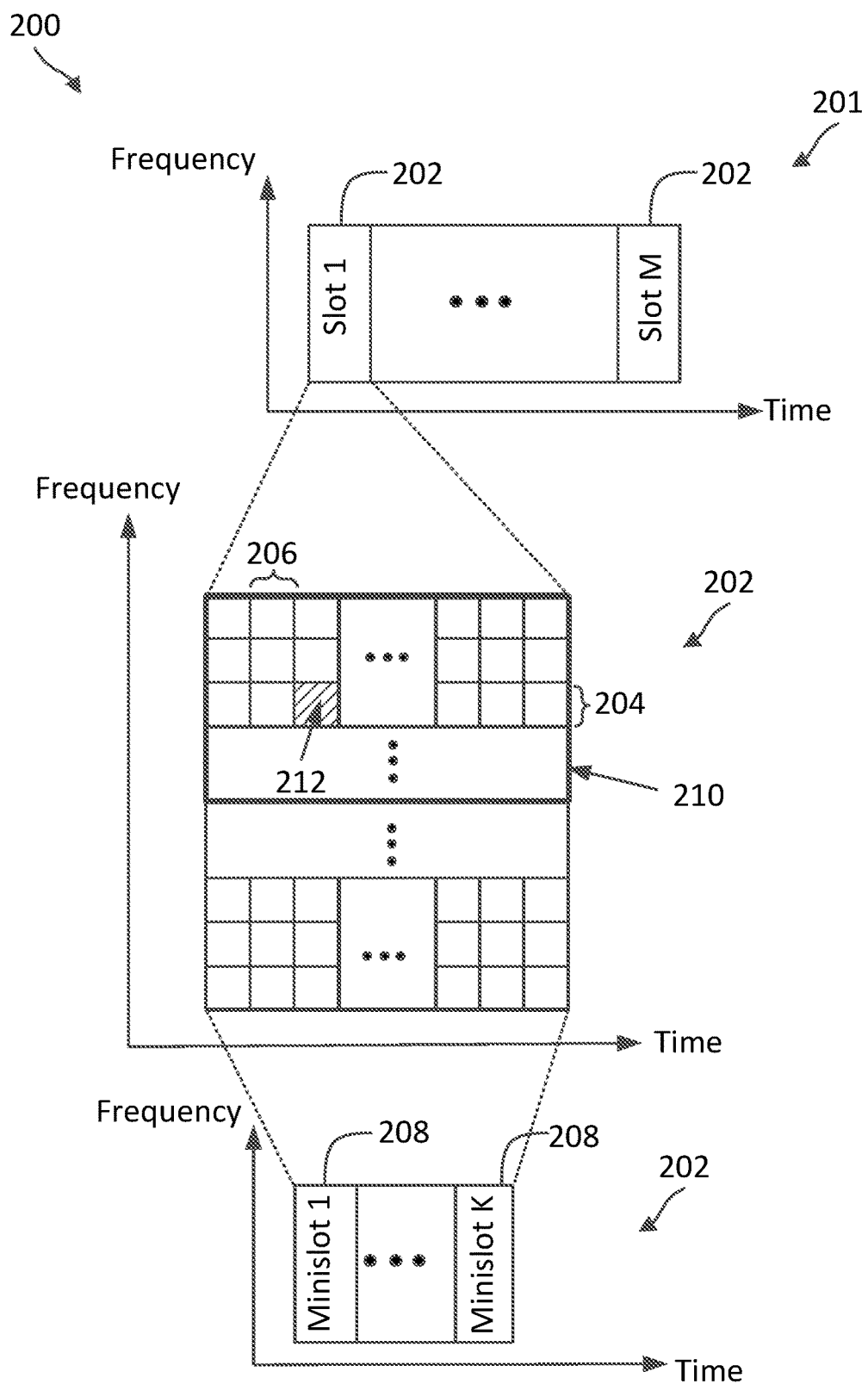
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel BW, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
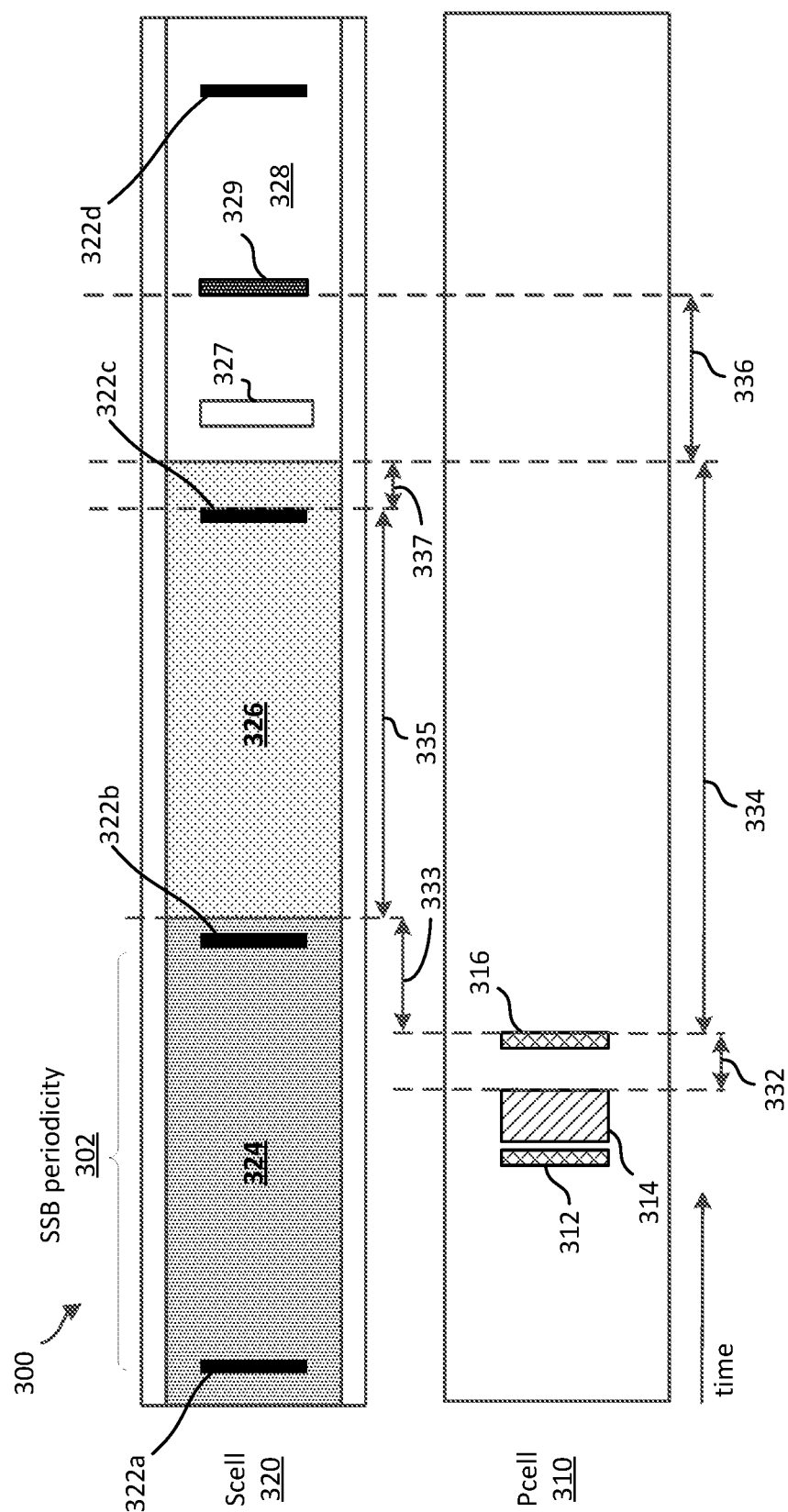
FIG. 3 illustrates a secondary cell (Scell) activation scheme using signal synchronization blocks (SSBs) according to some aspects of the present disclosure.

FIG. 3 illustrates an Scell activation scheme 300 according to some aspects of the present disclosure. The scheme 300 may be employed by BSs such as the BSs 105 and UEs such as the UEs 115 in a network such as the network 100 for communications. Described generally, the BS and UE may activate an Scell for scheduling DL/UL transmissions in response to an Scell activation signal 314 transmitted by the BS to a UE as shown in the scheme 300. The x-axis represent time in some arbitrary units.

FIG. 3 shows a Pcell 310 and an Scell 320. The Pcell 310, or primary cell, may be an anchor cell on which the UE receives control information and configurations from the BS. As explained above, in order to offload DL and/or UL traffic from the Pcell 310, the BS can activate a secondary cell in a carrier aggregation (CA) communication scheme. Activating the Scell 320 includes detecting or measuring reference signals (RSs) transmitted on the Scell 320 for automatic gain control (AGC), frequency tracking, time tracking, and/or cell detection. The protocols associated with activating the Scell 320 cause a delay from the time the BS 105 transmits an Scell activation command (314) until the time the S cell activation is complete. The total time or activation delay associated with activating the Scell 320 may be a sum of individual delay periods 332, 334, 336 associated with different stages or phases or the Scell activation, which will be explained further below. In some aspects, the Scell 320 may be known to the UE. For example, in some aspects, the UE may have previously activated and then deactivated the Scell 320. Accordingly, the UE may have stored configuration information (e.g., SSB transmission parameters, system information, receive signal strength) associated with the Scell 320 that can be used in reactivating the Scell 320. In other aspects, the Scell 320 may be unknown to the UE.

To activate the Scell 320, the BS transmits, to the UE, an activation command 314. In FIG. 3, the activation command 314 may be carried by a PDSCH. For example, the BS may transmit the activation command 314 in a MAC-CE carried by the PDSCH. The PDSCH may be associated with, and preceded by, a PDCCH including downlink control information (DCI) 312 scheduling the PDSCH. In response to receiving the activation command 314, the UE transmits an acknowledgement signal (ACK) 316 indicating that the activation command 314 has been received. The UE transmits the ACK 316 according to a HARQ communication protocol after a first delay period 332. The first delay period 332 may be referred to as $T_{HARQ}$, and may be representative of the timing between the DL data transmission including the activation command 314 and the transmission by the UE of the acknowledgement 316. In some aspects, the first delay period 332 may be predetermined based on a certain wireless communication protocol. In some other aspects, the first delay period 332 can be based on UE capabilities (e.g., the time associated with the UE decoding the DL data including the activation command 314).

In response to the activation command 314, the UE begins monitoring for RSs on the Scell 320. In particular, the UE may monitor for synchronization signal blocks (SSBs) on the Scell 320. The BS transmits, to the UE via the Scell 320, a plurality of SSBs 322 associated with an SSB periodicity 302. The BS may transmit one SSB or SSB burst every 20 ms, 40 ms, 80 ms, 160 ms, or any suitable periodicity. FIG. 3 illustrates three time stages or phases 324, 326, 328 associated with the Scell activation. It will be understood that the phases 324, 326, 328 are merely illustrative and may be modified without departing from the scope of the present disclosure. During a first phase or deactivated phase 324, the Scell 320 is deactivated, or inactive.

During the deactivated phase 324, the UE may not be monitoring for SSBs on the Scell 320. In this regard, during the deactivated phase 324, a first SSB 322a and a second SSB 322b are transmitted on the Scell 320, but may not be detected or measured by the UE. The BS transmits the first SSB 322a before the activation command 314 has been transmitted to the UE. The BS transmits the second SSB 322b after the activation command 314, but before the UE has started monitoring for SSBs on the Scell 320. In some aspects, there may be a delay 333 between transmitting the ACK 316 and the start of monitoring for SSBs by the UE. In some aspects, the delay 333 may be based on the UE capability of the necessary processing time for starting SCell activation procedure. In one aspect, the delay 333 may be 3 ms. However, it will be understood that the delay 333 can be any suitable value, including 1 ms, 2 ms, 5 ms, 7 ms, or 1 slot, 2 slots, 3 slots of a particular sub-carrier spacing, or any other suitable value, both greater and smaller.

After the delay 333, the UE monitors for an SSB 322 on the Scell 320 during an activation phase 326. The UE detects the first SSB that occurs during this phase 326, which is the third SSB 322c in FIG. 3. As explained above, each SSB 322 includes a plurality of reference signals, including primary synchronization signals (PSS), secondary synchronization signals (SSS), and physical broadcast channel demodulation reference signals (PBCH-DM-RS). The UE can perform measurements on one or more of these reference signals to perform various procedures associated with activating the Scell 320. For instance, the UE may perform AGC and/or fine tracking (e.g., time and/or frequency tracking) to tune the receiver at the UE in preparation of operating in the Scell 320. The delay 335 is the time or delay between the beginning of the SSB monitoring by the UE and the reception of the third SSB 322c. In one aspect, the delay 335 may be referred to as $T_{FirstSSB}$, or $T_{FirstSSBMax}$, and may be described as the time to the end of the first complete SSB burst indicated by the SMTC after the delay 332 ($T_{HARQ}$)+ the delay 333. The UE may perform measurements based on the third SSB 322c during the delay 337. Once the measurements have been performed, the Scell 320 may be activated such that the UE and/or BS can communicate via the Scell 320 during the activated phase 328.

The second delay 334 is representative of the total period from the transmission of the ACK signal 316 to the end of the delay 337, and includes the delays 333, 335 ($T_{FirstSSB}$), and 337. In one aspect, the second delay 334 may be referred to as $T_{ActivationTime}$. In one aspect, the delay 333 may be 3 ms, and the delay 337 may be 2 ms. Accordingly, in some aspects, $T_{ActivationTime}$ may be $T_{FirstSB}$+5 ms, where 5 ms is the sum of the delays 333 and 337. In some aspects, the delays 333 and/or 337 may be shorter than the predetermined or specified values, based on the time periods associated with the UE processing a reference signal, according to its implementations, and the delay 335 ($T_{FirstSSB}$) may be variable and based on the SSB periodicity 302 and the timing of the activation command 314.

The Scell 320 is considered activated once the UE can report valid channel state information (CSI) report based on the channel measurements to the BS. In this regard, the BS may configure the UE with channel measurement resources and may transmit a reference signal 327 in the channel measurement resources. The UE performs measurements on the reference signal 327 and transmits a measurement report 329. Although FIG. 3 illustrates the measurement report 329 being transmitted over the Scell 320, it should be understood that in other examples the measurement report 329 may be transmitted over another serving cell, for example, the Pcell 310 or another active Scell. In one aspect, the channel measurement resources may be channel state information-reference signal (CSI-RS) resources, the reference signal 327 may be a CSI-RS, and the report 329 may be a channel state information (CSI) report. The delay 336, which is the time period from the end of the delay 334 and the transmission of the report 329, may be referred to as $T_{CSIReporting}$. The delay 336 may vary depending on the configuration of the CSI-RS resources. The activated phase 328 may begin at the end of the delay 336. Thus, in some aspects a total Scell activation delay is determined based on the transmission of the activation command 314 and the transmission of the measurement report 329, and includes the delays 332, 334, and 336. In some aspects, the Scell activation delay may be measured in numbers of slots, and be determined based on the following relationship:

$$SCell \text{ activation delay} = \frac{T_{HARQ} + T_{ActivationTime} + T_{CSIReporting}}{\text{Slot Length}}$$

As explained above, one significant portion of the total activation delay is $T_{ActivationTime}$ (334), and particularly the $T_{FirstSSB}$ portion (335) of $T_{ActivationTime}$ 334. The length of $T_{FirstSSB}$ 335 is, in part, based on the SSB periodicity 302 which may be relatively sparse. The present disclosure provides mechanisms for reducing the Scell activation delay using one or more temporary reference signals in place of at least one SSB in an Scell activation procedure. For example, a BS may trigger a temporary reference signal, such as an NZP-CSI-RS or a TRS, and indicate the temporary RS signaling (e.g., slot index) to the UE. The UE may then detect the temporary RS based on the indication and perform one or more cell activation protocols, such as frequency tracking, time tracking, AGC, and/or cell detection. Accordingly, $T_{ActivationTime}$ 334, and consequently the total Scell activation delay, are reduced.

Figure 4:
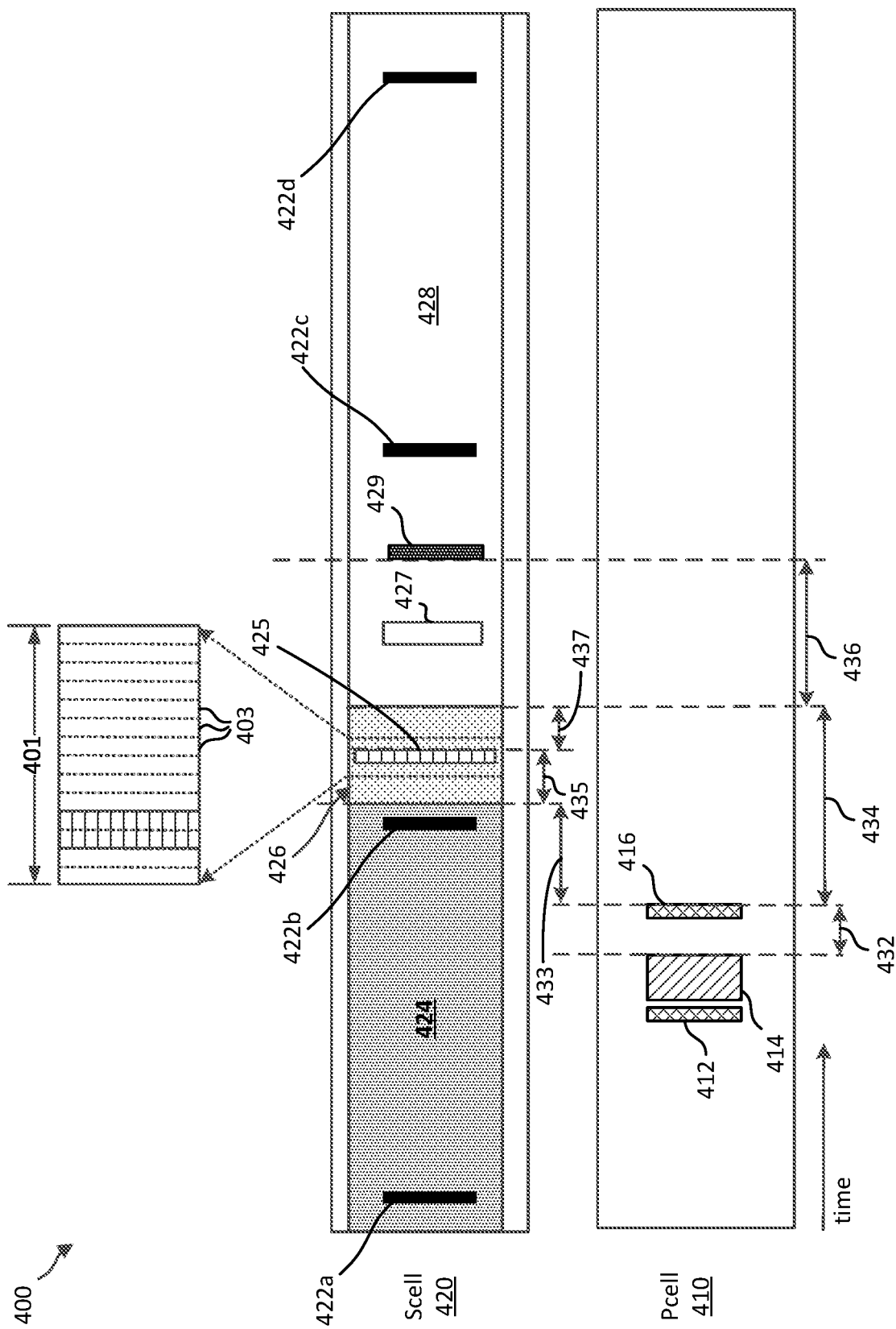
FIG. 4 illustrates an Scell activation scheme using one or more temporary reference signals (RSs) according to some aspects of the present disclosure.

FIG. 4 illustrates an Scell activation scheme 400 performed by a BS (e.g., BS 105) and a UE (e.g., UE 115). A BS and a UE may perform the Scell activation scheme 400 such that the UE can schedule DL data and/or UL data transmission on a different serving cell in a CA communication scenario. In FIG. 4, a primary cell or Pcell 410 is an anchor serving cell that is activated such that the UE can receive control information, network configurations, and DL data from the BS. As explained above, in order to offload DL and/or UL traffic from the Pcell 410, the BS can activate a secondary cell (Scell) 420. Activating the Scell 420 includes performing measurements on reference signals (RSs) transmitted on the Scell 420 for automatic gain control (AGC), frequency tracking, time tracking, and/or cell detection. The total time or activation delay associated with activating the Scell 420 may be a sum of individual delay periods 432, 434, 436. The delay period 434 includes delays 433, 435, 437. The scheme 400 of FIG. 4 involves using at least one temporary reference signal (RS) 425 to reduce the total activation delay associated with activating the Scell 420. In that regard, the BS may transmit the temporary RS 425 to the UE on the Scell 420 and indicate the slot/location of the temporary 425 to the UE such that the UE can perform measurements and/or detection protocols using the temporary RS 425.

Similar to the scheme 300 shown in FIG. 3, The BS periodically transmits SSBs 422 on the Scell 420 at a plurality of phases 424, 426, 428 of the Scell activation procedure. The first and second SSB 422a, 422b are transmitted during a deactivated phase 424, and the third and fourth SSBs 422c, 422d are transmitted during an activated phase 428. A temporary reference signal 425 that is different from an SSB 422 is transmitted during an intermediate or activation phase 426.

On the Pcell 410, the BS transmits control information 412 in a PDCCH to schedule DL data including an Scell activation command 414 in a PDSCH. In response to receiving the activation command 414, the UE transmits an acknowledgement (ACK) 416 associated with the activation command 414. The ACK 416 is transmitted after a first delay period 432, which may be referred to as $T_{HARQ}$. Following the transmission of the acknowledgement 416, a second delay period 434 begins, which may be referred to as $T_{ActivationTime}$. The second delay period 434 includes three delays 433, 435, 437. In one aspect, delays 433 and 437 may be based on UE capabilities. In one example, the delay 433 is 3 ms, and the delay 437 is 2 ms. However, the delays 433 and 437 may be longer or shorter, such as 1 ms, 2 ms, 3 ms, 5 ms, 7 ms, or any other suitable value, both greater or smaller. The delay 435 is representative of the time period between the end of the delay 433 and the reception of the temporary RS 425 by the UE. In one aspect, the delay 435 may be referred to as $T_{TempRS}$.

The BS transmits the temporary RS 425 to the UE on the Scell 420 after transmitting the activation command 414. In some aspects, the time (e.g., slot) in which the temporary RS 425 is transmitted is based on UE capabilities and/or network configurations. In some aspects, the BS transmits the temporary RS 425 in response to receiving the ACK signal 416 from the UE. The temporary RS 425 may be different from an SSB, and may be suitable for the UE to perform one or more procedures associated with the Scell activation, including time tracking, frequency tracking, and/or AGC. Since the temporary RS 425 is not part of an SSB, the BS can transmit the temporary RS 425 at an earlier time than a next scheduled SSB 422c, for example between SSBs 422b and 422c as shown, and can be transmitted more frequently than the SSBs 422, the duration of the delay 435 is reduced compared to the delay 335 shown in FIG. 3. Accordingly, the second delay 434 is also reduced, as well as the total Scell activation delay period. Thus, the Scell 420 is activated more quickly in the scheme 400 compared to the scheme 300 shown in FIG. 3.

An expanded view of the transmission of the temporary RS 425 is shown at the top of FIG. 4. The temporary RS 425 is transmitted in a slot 401. The temporary RS 425 may be associated with an NZP-CSI-RS resource set index indicating a set of time/frequency resources. The BS may indicate a trigger and/or configuration (e.g., the slot 401 and/or NZP-CSI-RS resource set index) of the temporary RS 425 in control information or in DL data. For example, in one aspect, the trigger and/or configuration of the temporary RS 425 may be indicated in a media access control element (MAC-CE) transmitted in a PDSCH. In some instances, the BS may indicate the temporary RS trigger and/or configuration and the activation command 514 in the same MAC-CE. In some other instances, the BS may indicate the temporary RS trigger and/or configuration in a different MAC-CE than the MAC-CE carrying the activation command 514. In another aspect, the BS indicates the trigger and/or configuration of the temporary RS 425 in downlink control information (DCI). For example, the DCI may be the control information 412 associated with the activation command 414. For example, the BS may transmit the DCI indicating the temporary RS trigger and/or configuration in a PDCCH that schedules the PDSCH that carries the activation command 314. In other aspects, the BS may transmit the DCI indicating the temporary RS trigger and/or configuration in a separate DCI from the DCI that schedules the activation command 314.

In one aspect, the scheme 400 of FIG. 4 may be used to reactivate the Scell 420 where the Scell 420 has been previously activated for the UE, such that the Scell 420 is "known" to the UE. Further, the scheme 400 may be used when the Scell measurement cycle is equal to or smaller than a given threshold. The threshold may be 160 ms, in some aspects. The threshold may be based on network specifications and/or configurations. In this regard, if the Scell is known to the UE, and the measurement cycle for the S cell 420 is lower than the given threshold, the number of cell measurement and detection protocols associated with the temporary RS for performing the Scell activation procedure may be reduced or limited. For example, when the SSB periodicity is small (less than the threshold), the UE may utilize measurements from previously measured SSB for receiver gain control. In the present example, the temporary RS 425 may be used for frequency tracking and time tracking (fine tracking) only. Accordingly, AGC may not be performed using the single temporary RS 425 in the scheme 400. Additionally, since the Scell is known to the UE, the UE may not perform cell detection for the Scell. However, as explained further below, in other aspects, the UE may perform additional measurement and/or detection protocols based on the temporary RS 425, such as AGC, for example, when the SSB periodicity in the Scell is above the threshold and/or when the Scell is unknown to the UE. In other aspects, the BS may transmit additional temporary RSs used for the additional measurement and/or detection protocols.

The temporary RS 425 may be an NZP-CSI-RS resource set. In one aspect, the temporary RS 425 is a tracking reference signal (TRS), which may be sparse reference signals that facilitate time and/or frequency tracking at a UE. In some instances, a BS may configure a NZP-CSI-RS resource set with a higher-layer parameter trs-info to serve as TRSs. In one aspect, the temporary RS 425 may include 2 NZP-CSI-RS resources in a slot, or 4 NZP-CSI-RS resources in two consecutive slots. A TRS may span over the bandwidth of the DL bandwidth part (BWP) which will be active when the Scell 420 is activated. For example, the TRS may span the first-active-DL-BWP-id, which may be configured by the network. In FIG. 4, the temporary RS 425 is shown within a single slot 401. However, in other aspects, the temporary RS 425 may occupy resources over more than one slot, such as two consecutive or non-consecutive slots. Additionally, in some instances, a temporary RS 425 may occupy more than one symbol (e.g., symbols 2 and 4) within the slot 401. In FIG. 4, the temporary RS 425 is shown occupying two OFDM symbols 403 within the slot 401. However, in other aspects, the temporary RS 425 may occupy 1, 2, 4, 5, 6, or any other suitable number of OFDM symbols within the slot 401.

After the UE receives the temporary RS 425 and the second delay period 434 ($T_{ActivationTime}$) has ended, a CSI-RS 427 is transmitted by the BS. The Scell 420 is considered activated once the UE can report channel measurements to the BS. In this regard, the BS may configure the UE with channel measurement resources and may transmit the CSI-RS 427 in the channel measurement resources. The UE may perform measurements based on the CSI-RS 427, and transmit a measurement report 429 to the BS. Although FIG. 4 illustrates the measurement report 429 being transmitted over the Scell 420, it should be understood that in other examples the measurement report 429 may be transmitted over another serving cell, for example, the Pcell 410 or another active Scell. The third delay period 436 is associated with the time between the end of the second delay 434 and the transmission of the report 429. The third delay 436 may be referred to as $T_{CSIReporting}$, in some aspects. As similarly explained above in relation to FIG. 3, the third delay 436 can vary depending on the resource configuration for the CSI-RS 427. The activated phase 428 may begin at the end of the delay 436.

As explained above, because the delay associated with receiving the RS ($T_{ActivationTime}$) is reduced compared to the scheme 300 shown in FIG. 3, the entire Scell activation delay can be significantly reduced. The scheme 400 may be used, for instance, if the Scell 420 is known to the UE and the measurement cycle for the Scell is less than a threshold (e.g., 160 ms). In this regard, when the measurement cycle is relatively low, a single temporary RS may be used by the UE to perform time/frequency tracking, and additional RSs may not be needed to perform some of the measurements and/or detection protocols to activate the Scell. However, in some aspects, the measurement cycle of the Scell may be higher than a threshold, such that additional RSs can be transmitted and used by the UE to perform additional measurements to activate the Scell.

FIGS. 5A-5E illustrate Scell activation schemes 500a-500e performed by a BS (e.g., BS 105) and a UE (e.g., UE 115), according to aspects of the present disclosure. A BS and a UE may perform the Scell activation schemes 500a-500e such that the UE can schedule DL data and/or UL data transmission on a different serving cell in a CA communication scenario. In FIGS. 5A-5E, a primary cell or Pcell 510 is an anchor serving cell that is activated such that the UE can receive control information, network configurations, and DL data from the BS. The total time or activation delay associated with activating the Scell 520 may be a sum of individual delay periods 532, 534, 536, which may be similar to the delay periods 432, 434, and 436 described above with respect to FIG. 4. The delay period 534 includes delays 533, 535, 537. As will be further explained below, the schemes 500a-500e of FIGS. 5A-5E involve using one or more temporary RSs 525, in place of at least one SSB 522 to reduce the total activation delay associated with activating the Scell 520.

Similar to the schemes 300 and 400 shown in FIGS. 3 and 4, in the schemes 500a-500e, the BS periodically transmits SSBs 522 on the Scell 520 at a plurality of phases 524, 526, 528 of the Scell activation procedure. For example, referring to FIGS. 5A, 5B, and 5E, the BS transmits the first and second SSB 522a, 522b during a deactivated phase 524, and transmits the third and fourth SSBs 522c, 522d during an activated phase 528. Referring to FIGS. 5C and 5D, the BS transmits the third SSB 522c in the intermediate or activation phase 526. The BS may transmit one or more temporary RS 525a and a second temporary RS 525b during the activation phase 526. In some aspects, at least one of the temporary RSs 525 is different from an SSB 522.

Referring generally to FIGS. 5A-5E, on the Pcell 510, the BS transmits control information 512 in a PDCCH scheduling DL data including an Scell activation command 514 in a PDSCH. In response to receiving the activation command 514, the UE transmits an acknowledgement (ACK) 516 associated with the activation command 414. The ACK 516 is transmitted after a first delay period 532, which may be referred to as $T_{HARQ}$. Following the transmission of the acknowledgement 516, a second delay period 534 begins, which may be referred to as $T_{ActivationTime}$. The second delay period 534 includes three delays 533, 535, 537. In one aspect, delays 533 and 537 may be based on UE capabilities, as explained above. In one example, the delay 533 is 3 ms, and the delay 537 is 2 ms. However, the delays 533 and 537 may be longer or shorter, such as 1 ms, 2 ms, 3 ms, 5 ms, 7 ms, or any other suitable value, both greater or smaller.

The delay 535 is representative of the time period between the end of the delay 533 and the reception of the last RS used for Scell activation (e.g., second temporary RS 525b). In one aspect, the delay 535 may be referred to as $T_{RS\_fine\_tracking}$. The temporary RSs 525 may be different from an SSB, and may be suitable for the UE to perform one or more procedures associated with the Scell activation, including time tracking, frequency tracking, AGC, and/or cell detection. Because the temporary RSs 525 can be transmitted between respective SSBs 522, and can be transmitted more frequently than the SSBs 422, the duration of the delay 535 can be reduced compared to the delay 335 shown in FIG. 3. Accordingly, the second delay 534 ($T_{ActivationTime}$) is also reduced, as well as the total Scell activation delay period. Thus, the Scell 520 is activated more quickly in the schemes 500a-500d compared to the scheme 300 shown in FIG. 3.

The BS transmits the temporary RSs 525 to the UE after transmitting the activation command 514. In one aspect, the temporary RSs 525 may be used to reactivate the Scell 520 where the Scell 520 has been previously activated for the UE, such that the Scell 520 is known to the UE. Further, the schemes 500a-500e may be used when the Scell measurement cycle is greater than a given threshold. The threshold may be 160 ms, in some aspects. The threshold may be based on network specifications and/or configurations. In this regard, if the Scell 520 is known to the UE, the number of cell measurement and detection protocols associated with the temporary RS for performing the Scell activation procedure may be reduced or limited. Compared to the scheme 400, the UE may perform AGC prior to fine tracking when the SSB periodicity in the Scell is greater than a certain threshold. For example, one or more of the temporary RSs 525 may be used for frequency tracking and time tracking (fine tracking) and AGC. For example, referring to FIG. 5A, AGC may be performed based on the first temporary RS 525a, and frequency and time tracking (e.g., fine tracking) may be performed using the second temporary RS 525b.

Figure 5A:
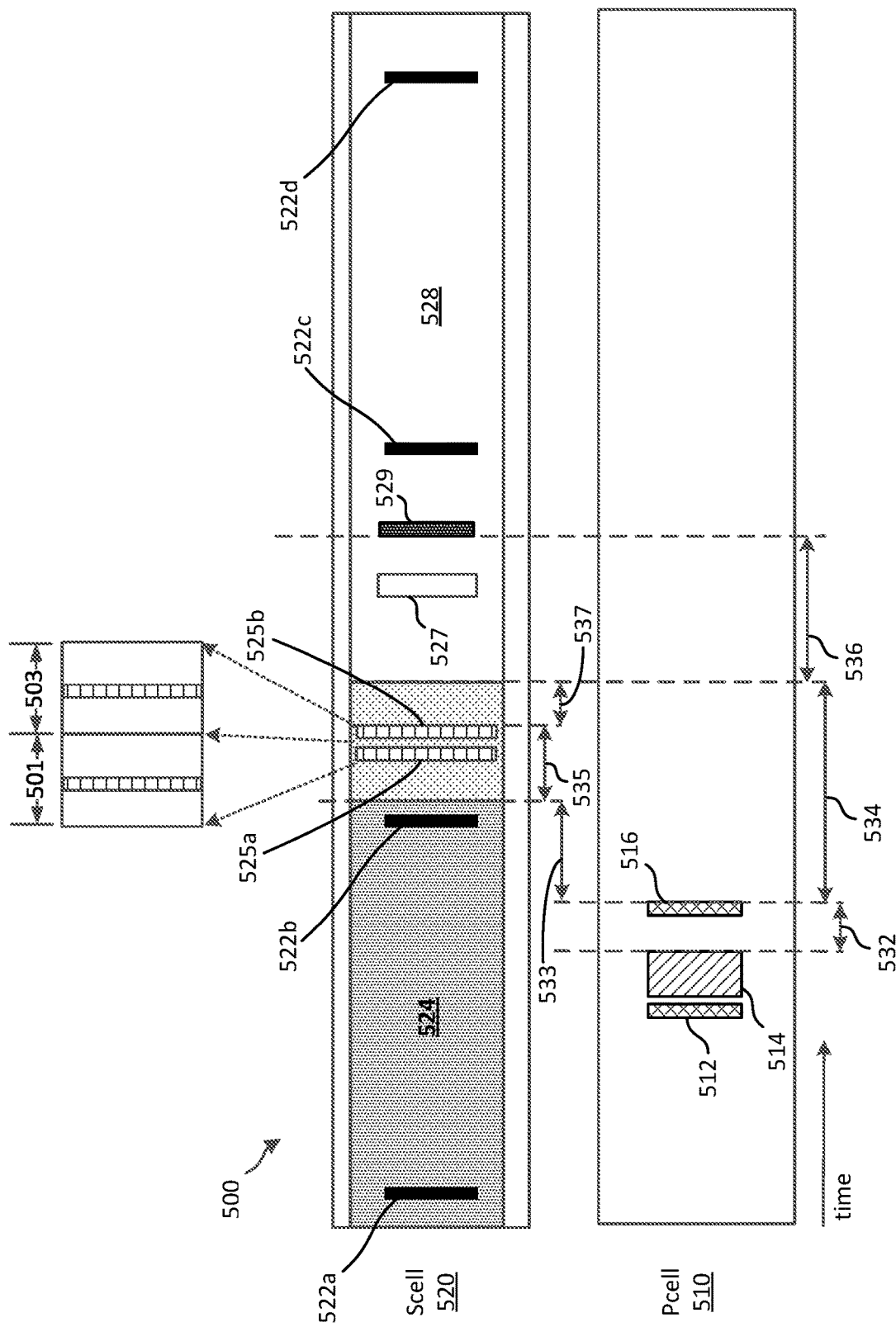
FIG. 5A illustrates an Scell activation scheme using temporary RSs according to some aspects of the present disclosure.

Referring to FIG. 5A, the BS transmits the first temporary RS 525a in a first slot 501, and transmits the second temporary RS 525b in a second slot 503 that is consecutive with the first slot 501. In this regard, in the scheme 500a of FIG. 5A, the UE may perform AGC using the first temporary RS 525a transmitted in the first slot 501, and frequency and/or time tracking using the second temporary RS 525b transmitted in the second slot 503. The temporary RSs 525a and 525b can be substantially similar to the temporary RS 425. In some aspects, the temporary RSs 525 may use the same symbols within each respective slot 501, 503. In other aspects, the temporary RSs 525 may use different symbols within each respective slot 501, 503. In some aspects, the UE may perform AGC only using both the of the temporary RSs 525a, 525b.

Figure 5B:
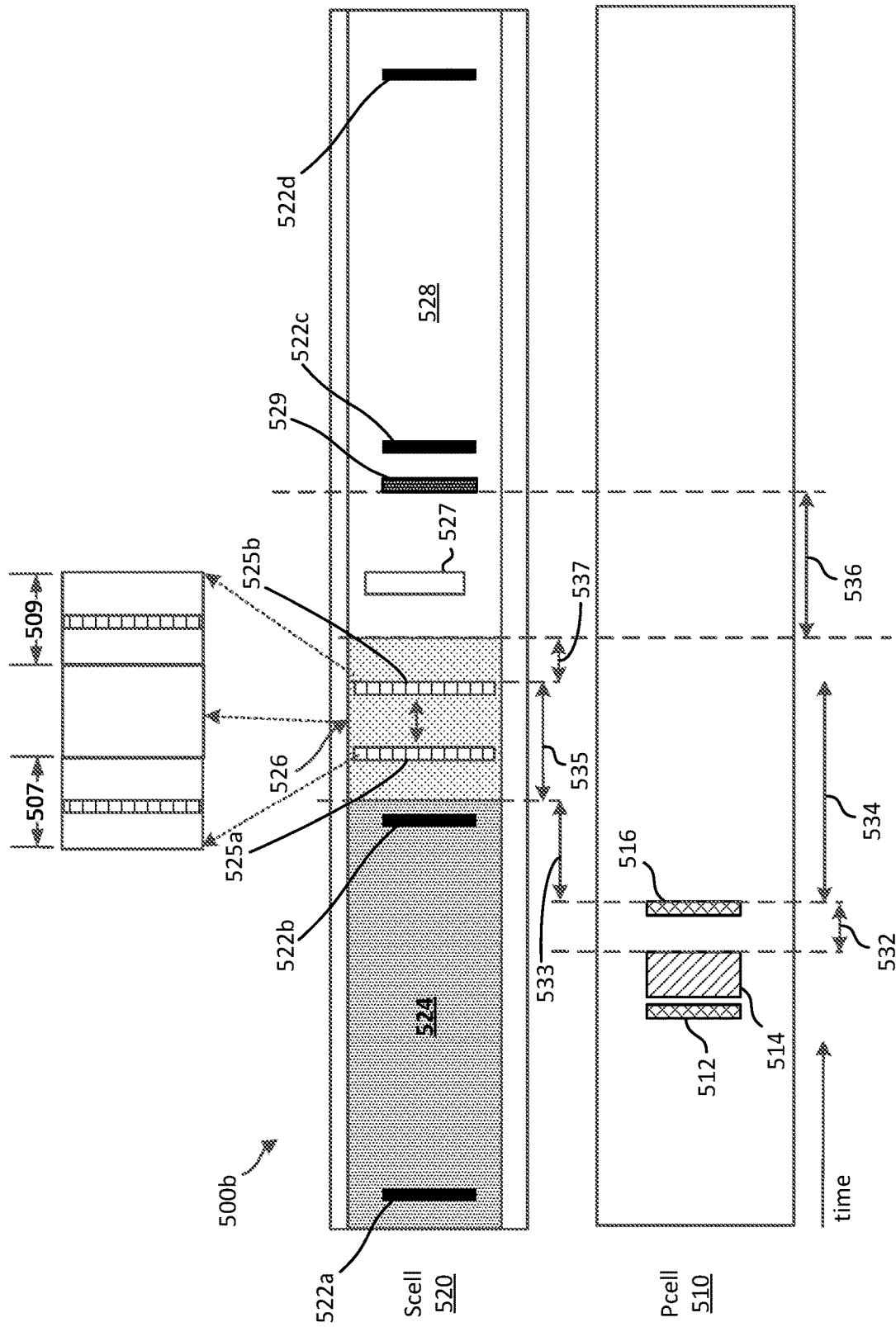
FIG. 5B illustrates an Scell activation scheme using temporary RSs according to some aspects of the present disclosure.
Figure 5C:
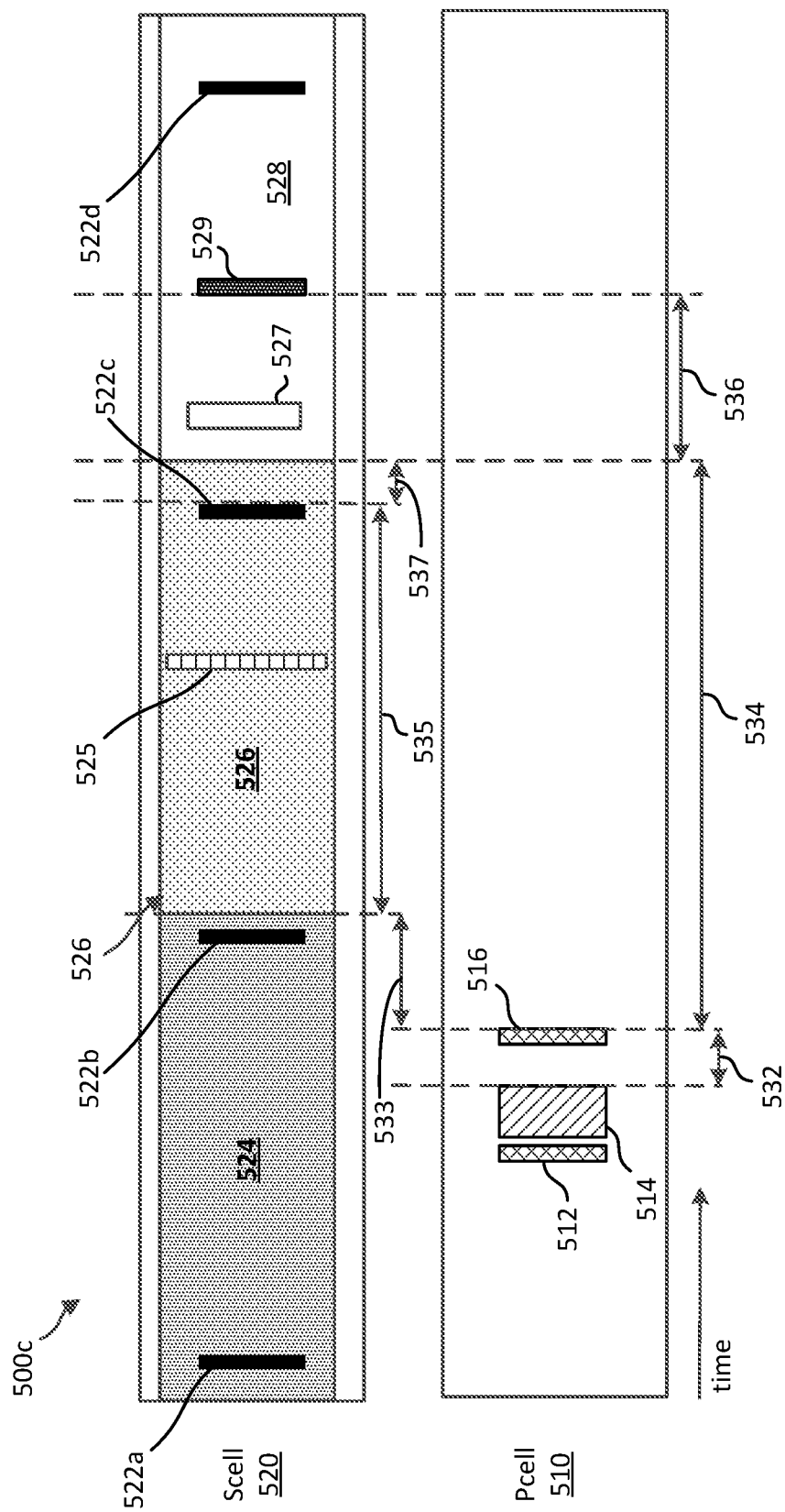
FIG. 5C illustrates an Scell activation scheme using one or more temporary RSs according to some aspects of the present disclosure.
Figure 5D:
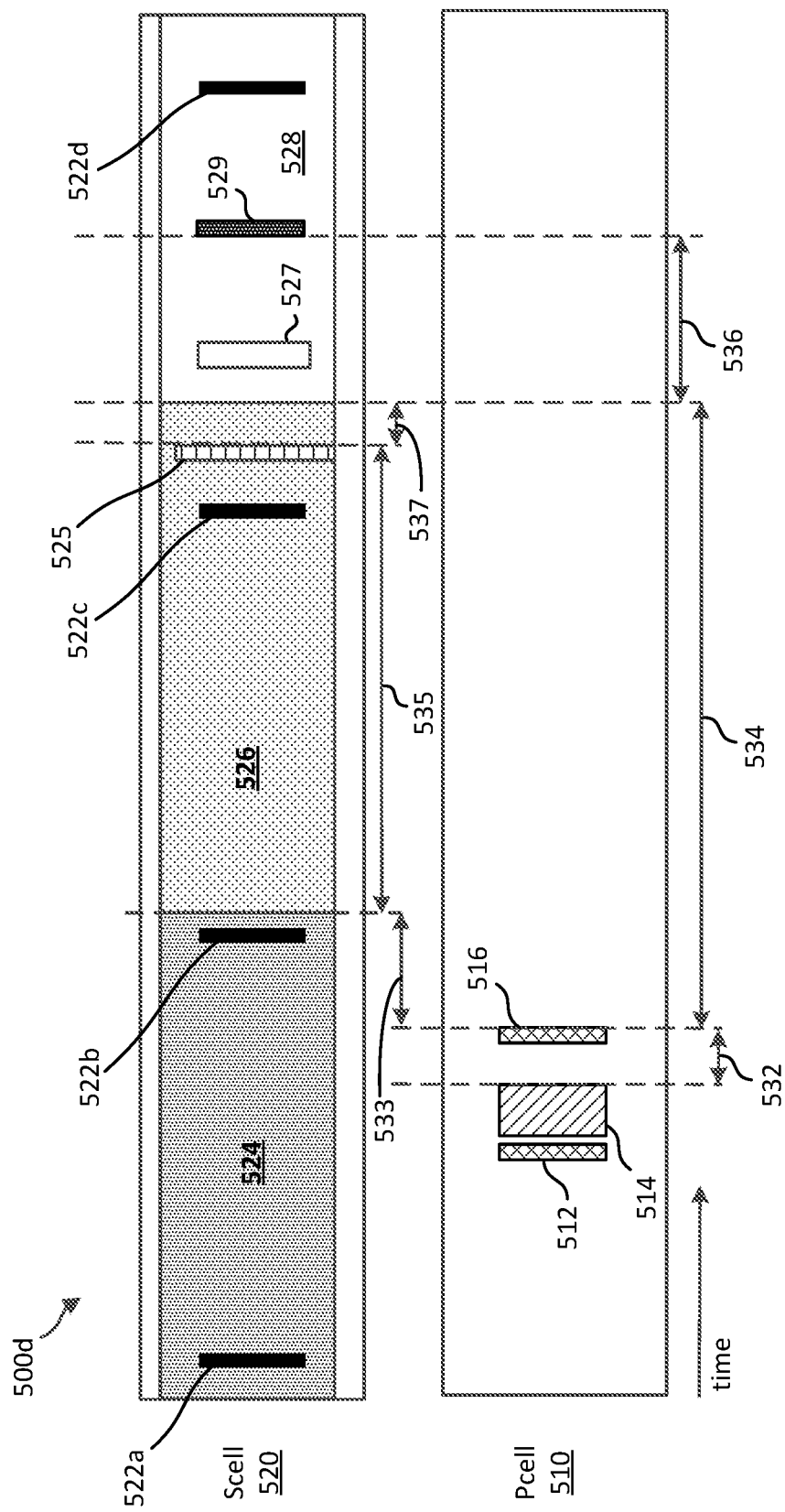
FIG. 5D illustrates an Scell activation scheme using one or more temporary RSs according to some aspects of the present disclosure.

Referring to the scheme 500b of FIG. 5B, the BS transmits the first temporary RS 525b in a first slot 507, and transmits the second temporary RS 525b in a second slot 509 that is non-consecutive with the first slot 507. In this regard, in the scheme 500b of FIG. 5B, the UE may perform AGC using the first temporary RS 525a in the first slot 507, and frequency and/or time tracking using the second temporary RS 525b in the second slot 509. In some aspects, the temporary RSs 525 may use the same symbols within each respective slot 507, 509. In other aspects, the temporary RSs 525a, 525b may use different symbols within each respective slot 507, 509. In one aspect, the UE uses a single temporary RS, such as the first temporary RS 525a, for AGC, and uses one of the SSBs, such as the third SSB 522c, for frequency and/or time tracking. In some aspects, the scheme 500b allows for a slot and/or symbol level gap between the temporary RS 525a used for AGC and the temporary RS 525b used for time/frequency tracking. In some aspects, the slot and/or symbol level gap can depend on the network configuration and/or UE capabilities. For example, in one aspect, the time gap between the temporary RSs 525a, 525b may be based on a capability report transmitted to the BS by the UE.

Referring to FIGS. 5C and 5D, in some aspects, the UE may use one or more temporary RSs 525 for one or more of the tracking/detection protocols, and one or more SSBs 522 for one or more of the tracking/detection protocols. For example, referring to the scheme 500c of FIG. 5C, the UE uses the first temporary RS 525a received during the activation phase 526 to perform AGC, and the third SSB 522c to perform frequency and/or time tracking. Referring to the scheme 500d of FIG. 5D, the UE uses the third SSB 522c to perform AGC, and the first temporary RS 525a, which is transmitted after the third SSB 522b, to perform frequency and/or time tracking. In one aspect, the first temporary RS 525a shown in FIG. 5D may be a single TRS received over 1 or 2 consecutive slots. In some aspects, the schemes 500c and 500d allow for a slot and/or symbol level gap between the RS (e.g., temporary RS 525a, SSB 522c) used for AGC and the RS (e.g., SSB 522c, temporary RS 525a) used for time/frequency tracking. In some aspects, the slot and/or symbol level gap can depend on the network configuration and/or UE capabilities.

Figure 5E:
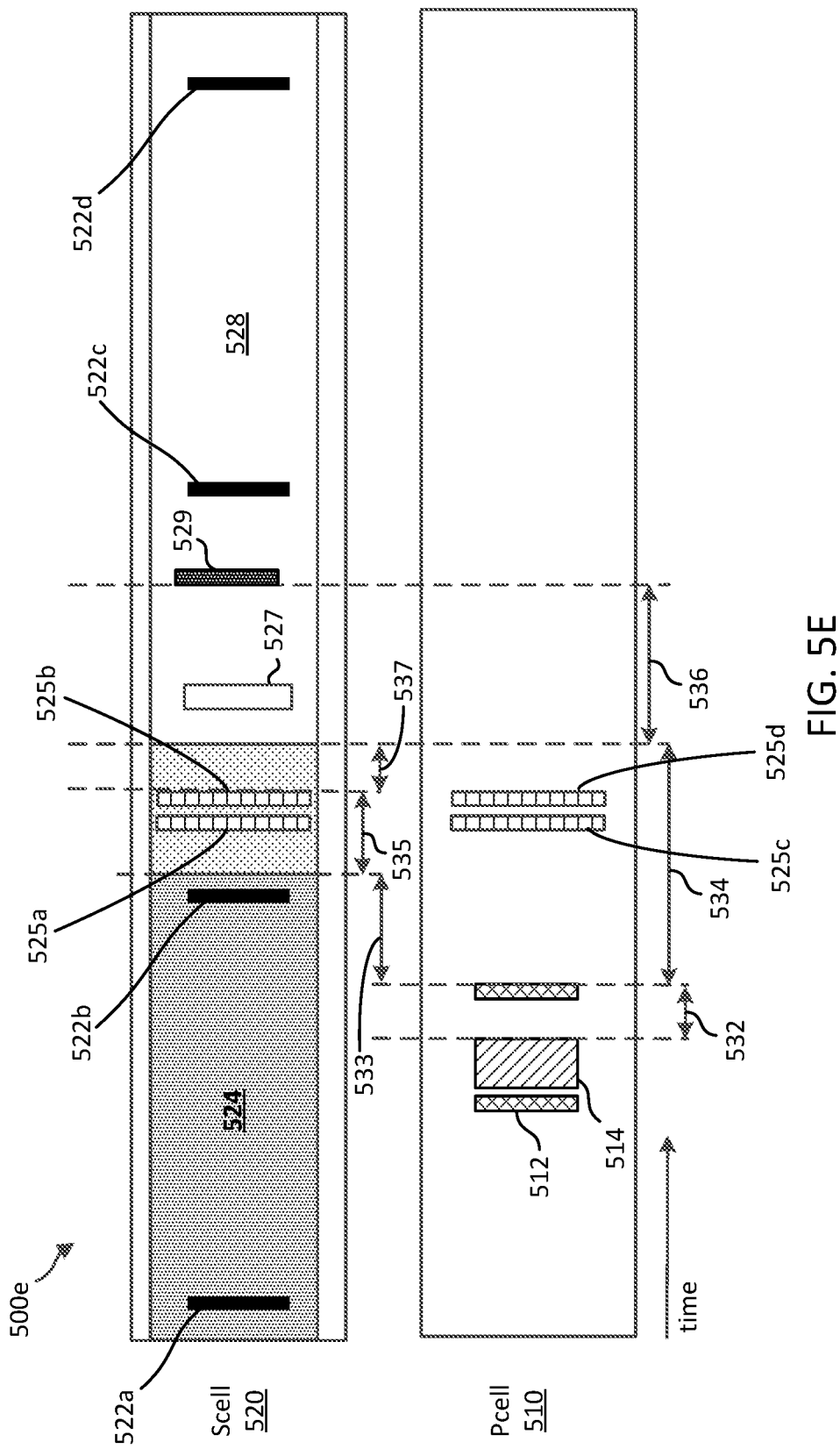
FIG. 5E illustrates an Scell activation scheme using temporary RSs according to some aspects of the present disclosure.

Referring to FIG. 5E, in some aspects, one or more of the temporary RSs 525 may be transmitted on the Pcell 510 in addition to the Scell 520. In particular, the BS may transmit temporary RSs 525 on both cells 510, 520 when the Scell 520 is in a same band as the Pcell 510. FIG. 5E shows a third temporary RS 525c and a fourth temporary RS 525d transmitted on the Pcell 510. The third temporary RS 525c may correspond to and temporally align with the first temporary RS 525a. The fourth temporary RS 525d may correspond to and temporally align with the second temporary RS 525b. In some aspects, the first temporary RS 525a and the third temporary RS 525c are transmitted on their respective cells in a same slot. Similarly, in some aspects, the second temporary RS 525b and the fourth temporary RS 525d are transmitted on their respective cells in a same slot.

Referring still to the scheme 500e of FIG. 5E, in one aspect, the UE may use both the first temporary RS 525a and the third temporary RS 525c to perform AGC on each respective cell 510, 520. In some aspects, the UE may perform AGC using one of the temporary RS 525a or the temporary RS 525c and apply the same receiver gains (determined from the AGC) for receiving signals from the Scell 520 or the Pcell 510. In another aspect, the UE can use both the second temporary RS 525b and the fourth temporary RS 525d to perform frequency and/or time tracking on each respective cell 510, 520. In some aspects, only one of the temporary RS 525 is transmitted on both cells. For example, in one aspect, the BS transmits only the third temporary RS 525c, but not the fourth temporary RS 525d, on the Pcell 510. Accordingly, in some aspects, the UE may perform AGC using temporary RSs 525 for the Pcell 510, but may not perform frequency and/or time tracking using temporary RSs 525 for the Pcell 510. In another aspect, the BS transmits only the fourth temporary RS 525d but not the third temporary RS 525c, on the Pcell 510. Accordingly, in some aspects, the UE may perform frequency and/or time tracking using temporary RSs 525 for the Pcell 510, but may not perform AGC using temporary RSs 525 for the Pcell 510. In general, when the Pcell 510 and the Scell 520 operate in the same frequency band, the BS may transmit temporary RSs over the Pcell 510 and/or Scell 520 to assist the UE in performing AGC and/or fine tracking for operating in the Pcell 510 and/or Scell 520.

Referring generally to FIGS. 5A-5E, one or more of the temporary RSs 525 may be associated with an NZP-CSI-RS resource set index indicating a set of time/frequency resources. The BS may indicate a trigger or configuration (e.g., the slots 501, 503, 507, 509 and/or NZP-CSI-RS resource set index) of the temporary RSs 525 in control information, or in scheduled DL data. For example, in one aspect, the trigger or configuration of the temporary RSs 525 may be indicated in a MAC-CE transmitted in a PDSCH. In some instances, the BS may indicate the temporary RS trigger and/or configuration and the activation command 514 in the same MAC-CE. In some other instances, the BS may indicate the temporary RS trigger and/or configuration in a different MAC-CE than the MAC-CE carrying the activation command 514. In another aspect, the BS may indicate the trigger and/or configuration of the temporary RSs 525 in downlink control information (DCI). For example, the DCI may be the control information 512 associated with the activation command 514. For example, the DCI may be the scheduling DCI for the activation command 514. In other aspects, the DCI indicating the temporary RS trigger and/or configuration may be separate from the DCI that schedules the activation command 514.

One or more of the temporary RSs 525 used in the schemes 500a-500e may include NZP-CSI-RSs. In one aspect, one or more of the temporary RSs 525 is a tracking reference signal (TRS), which can be configured by an NZP-CSI-RS resource set configured with trs-info. In one aspect, one or more of the temporary RSs 525 may include 2 NZP-CSI-RS resources in a slot, or 4 NZP-CSI-RS resources in two consecutive slots. A TRS may span over the bandwidth of the DL bandwidth part (BWP) which will be active when the Scell 520 is activated. For example, the TRS may span the first-active-DL-BWP-id, which may be configured by the network.

After the second delay period 534 ($T_{ActivationTime}$) has ended, the BS transmits a CSI-RS 527. The UE may perform measurements based on the CSI-RS 527, and transmit a measurement report 529 to the BS. The third delay period 536 is associated with the time between the end of the second delay 534 and the transmission of the report 529. The third delay 536 may be referred to as $T_{CSIReporting}$, in some aspects. The Scell 520 may be considered activated once the UE can report channel measurements to the BS. Accordingly, the activated phase 528 may begin at the end of the delay 536.

Figure 6:
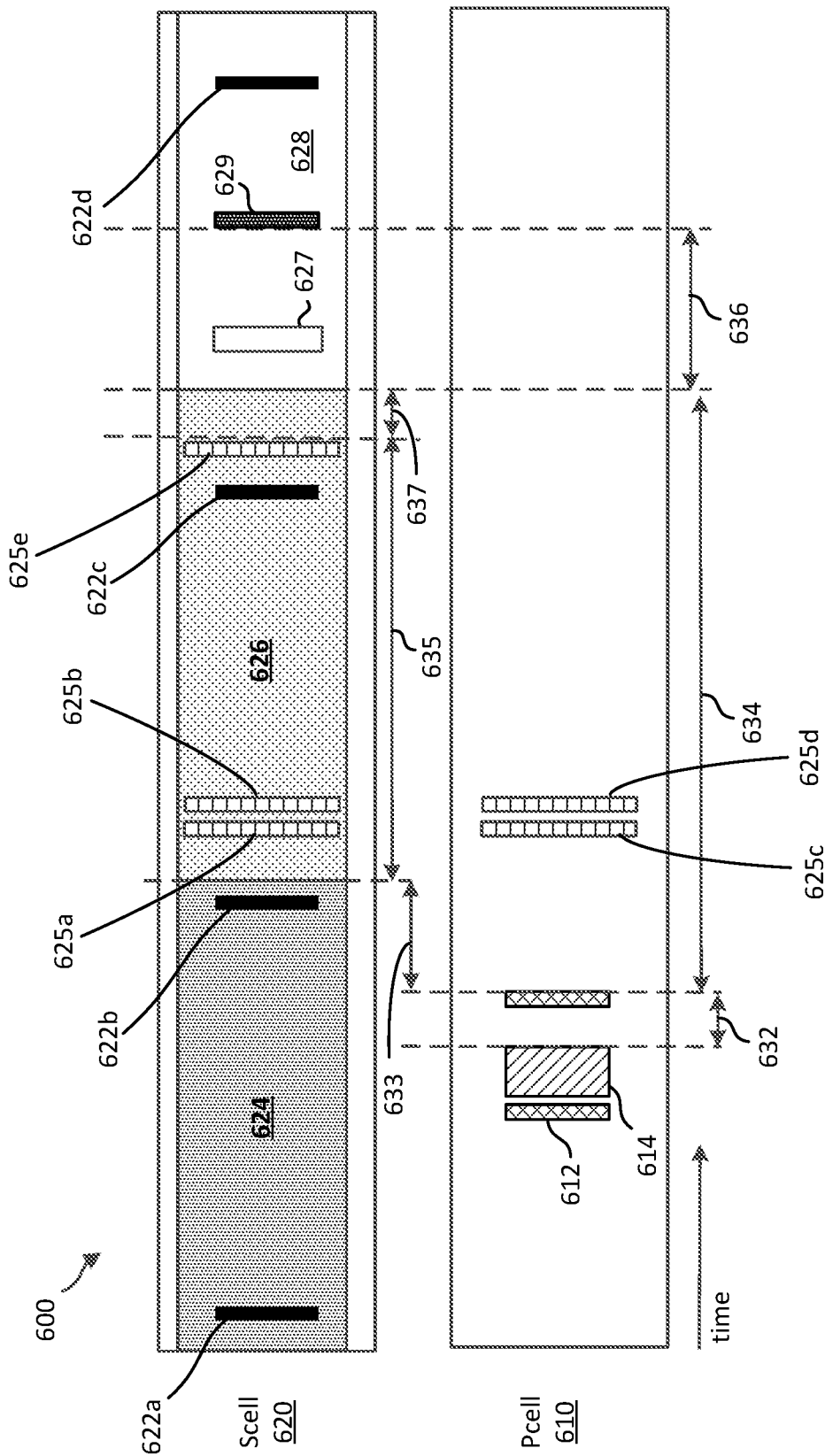
FIG. 6 illustrates an Scell activation scheme using temporary RSs according to some aspects of the present disclosure.

FIG. 6 illustrates an Scell activation scheme 600 performed by a BS (e.g., BS 105) and a UE (e.g., UE 115), according to aspects of the present disclosure. A BS and a UE may perform the Scell activation scheme 600 such that the UE can schedule DL data and/or UL data transmission on an Scell 620 in a CA communication scenario. In FIG. 6, a Pcell 610 is an anchor serving cell that is activated such that the UE can receive control information, network configurations, and DL data from the BS. The total time or activation delay associated with activating the Scell 620 may be a sum of individual delay periods 632, 634, 636, which may be similar to the delay periods 432, 434, and 436 described above with respect to FIG. 4. The delay period 634 includes delays 633, 635, 637.

In one aspect, the temporary RSs 625 may be used to activate the Scell 620 where the Scell 620 has been not been previously activated for the UE, such that the Scell 520 is unknown to the UE. In this regard, if the Scell is unknown to the UE, the UE may need to perform additional measurement/detection protocols to activate the Scell 620 compared to the schemes 400, 500a-500e described above. For example, to activate the previously unknown Scell 620, the UE may perform AGC, time/frequency tracking (fine tracking), and cell detection. In some instances, to activate an unknown cell, the UE may use 4 periodically transmitted SSBs 622 to perform an Scell activation. For example, the UE may utilize two SSBs 622 for performing AGC, one SSB 622 for cell detection, and one SSB 622 for fine tracking. In the scheme 600, the UE can use one or more temporary RSs 625 in place of one or more SSBs 622 to reduce the Scell activation delay. In some aspects of the scheme 600, the UE may use a different RS or group of RSs to perform each of the Scell activation procedures. For example, the UE may use at least one SSB to perform cell detection, and may use one or more temporary RSs 625 to perform AGC and time/frequency tracking.

Similar to the schemes 300, 400, and 500a-500e shown in FIGS. 3-5E, in the scheme 600, the BS periodically transmits SSBs 622 on the Scell 620 at different phases 624, 626, 628 of the Scell activation procedure. In this regard, the BS transmits first and second SSB 622a, 622b during a deactivated phase 624, transmits the third SSB 622c during an activation phase 626, and transmits a fourth SSBs 622d during an activated phase 628. The BS may transmit one or more temporary RS 625 during an intermediate or activation phase 626. In some aspects, at least one of the temporary RSs 625 is different from an SSB 622.

The BS transmits control information 612 in a PDCCH to schedule DL data including an Scell activation command 614 in a PDSCH. In response to receiving the activation command 614, the UE transmits an acknowledgement (ACK) 616 associated with the activation command 614. The ACK 616 is transmitted after a first delay period 632, which may be referred to as $T_{HARQ}$. Following the transmission of the acknowledgement 616, a second delay period 634 begins, which may be referred to as $T_{ActivationTime}$ The second delay period 634 includes three delays 633, 635, 637. In one aspect, delays 633 and 637 may be based on UE capabilities, as explained above. In one example, the delay 633 is 3 ms, and the delay 637 is 2 ms. However, the delays 633 and 637 may be longer or shorter, such as 1 ms, 2 ms, 3 ms, 5 ms, 7 ms, or any other suitable value, both greater or smaller.

The delay 635 is representative of the time period between the end of the delay 633 and the reception of the last RS used for frequency and/or time tracking (e.g., fifth temporary RS 625e). In one aspect, the delay 635 may be referred to as $T_{RS\_fine\_tracking}$. In the scheme 600 of FIG. 6, the BS transmits a plurality of temporary RSs 625 on the Scell 620 at various times during the activation phase 626. The UE uses a first temporary RS 625a and a second temporary RS 625b transmitted by the BS to perform AGC. The UE also uses a third temporary RS 625c and a fourth temporary RS 625d to perform AGC for the Pcell 610. Similar to the scheme 500e shown in FIG. 5E, the third and fourth temporary RSs 624c, 625d may be transmitted on the Pcell 610 when the Pcell 610 and the Scell 620 are on a same frequency band. In some aspects, the first and third temporary RSs 625a, 625c may be transmitted in a same slot, and the second and fourth temporary RSs 625b, 625d may be transmitted in a same slot. The BS may transmit the first and second temporary RSs 625, 625b in consecutive slots, non-consecutive slots, or in a same slot.

The UE uses the third SSB 622c to perform cell detection, and a fifth temporary RS 625e to perform frequency and/or time tracking (e.g., fine tracking). In some aspects, the BS may transmit a sixth RS on the Pcell 610, and the UE may perform frequency and/or time tracking on the Pcell 610 based on the sixth RS. In some aspects, one or more of the temporary RSs 625 may be an NZP-CSI-RS. In some aspects, one or more of the temporary RSs 625 is a TRS. A TRS may be transmitted over 2 consecutive slots, in some aspects. In other aspects, 2 TRSs may be transmitted over 2 or 4 consecutive slots. In some aspects, the UE may use at least at least one SSB 622 for the Scell activation. In other aspects, the UE may use only non-SSB temporary RSs for the Scell activation. In other aspects, the UE may use one or more SSBs for an Scell activation task other than cell detection. For example, in one aspect, the UE may use one or more SSBs for frequency and/or time tracking instead of or in addition to using one or more SSBs for cell detection.

The temporary RSs 625 may be different from an SSB 622, and may be suitable for the UE to perform one or more procedures associated with the Scell activation, including time tracking, frequency tracking, AGC, and/or cell detection. Because the temporary RSs 625 can be transmitted between respective SSBs 622, and can be transmitted more frequently than the SSBs 622, the duration of the delay 635 can be reduced compared to an Scell activation procedure for an unknown Scell in which 4 SSBs are used. Accordingly, the second delay 634 ($T_{ActivationTime}$) can also be reduced, as well as the total Scell activation delay period.

One or more of the temporary RSs 625 may be associated with an NZP-CSI-RS resource set index indicating a set of time/frequency resources. The slots and/or NZP-CSI-RS resource set index of the temporary RSs 625 may be indicated or triggered by the BS in control information or in DL data. For example, in one aspect, a trigger or configuration (e.g., the slots and/or NZP-CSI-RS resource set index) of the temporary RSs 625 may be indicated in a MAC-CE transmitted in a PDSCH. In some instances, the BS may indicate the temporary RS trigger and/or configuration and the activation command 614 in the same MAC-CE. In some other instances, the BS may indicate the temporary RS trigger and/or configuration in a different MAC-CE than the MAC-CE carrying the activation command 614. In another aspect, the trigger and/or configuration of the temporary RSs 625 may be indicated by the BS in downlink control information (DCI). For example, the DCI may be the control information 612 associated with the activation command

614. For example, the DCI may be the scheduling DCI for the activation command 614. In other aspects, the DCI indicating the temporary RS trigger and/or configuration may be separate from the DCI that schedules the activation command 614.

One or more of the temporary RSs 625 may be an NZP-CSI-RS resource set. In one aspect, one or more of the temporary RSs 625 is a tracking reference signal (TRS), which can be configured by an NZP-CSI-RS resource set configured with trs-info. In one aspect, one or more of the temporary RSs 625 may include 2 NZP-CSI-RS resources in a slot, or 4 NZP-CSI-RS resources in two consecutive slots. A TRS may span over the bandwidth of the DL bandwidth part (BWP) which will be active when the Scell 620 is activated. For example, the TRS may span the first-active-DL-BWP-id, which may be configured by the network.

After the BS transmits the temporary RSs 625 and the second delay period 634 ($T_{ActivationTime}$) has ended, a CSI-RS 627 is transmitted by the BS. The UE may perform measurements based on the CSI-RS 627 and transmit a measurement report 629 to the BS. The third delay period 636 is associated with the time between the end of the second delay 634 and the transmission of the measurement report 629. The third delay 636 may be referred to as $T_{CSIReporting}$, in some aspects. The activation phase 628 may begin after the third delay 636.

Figure 7:
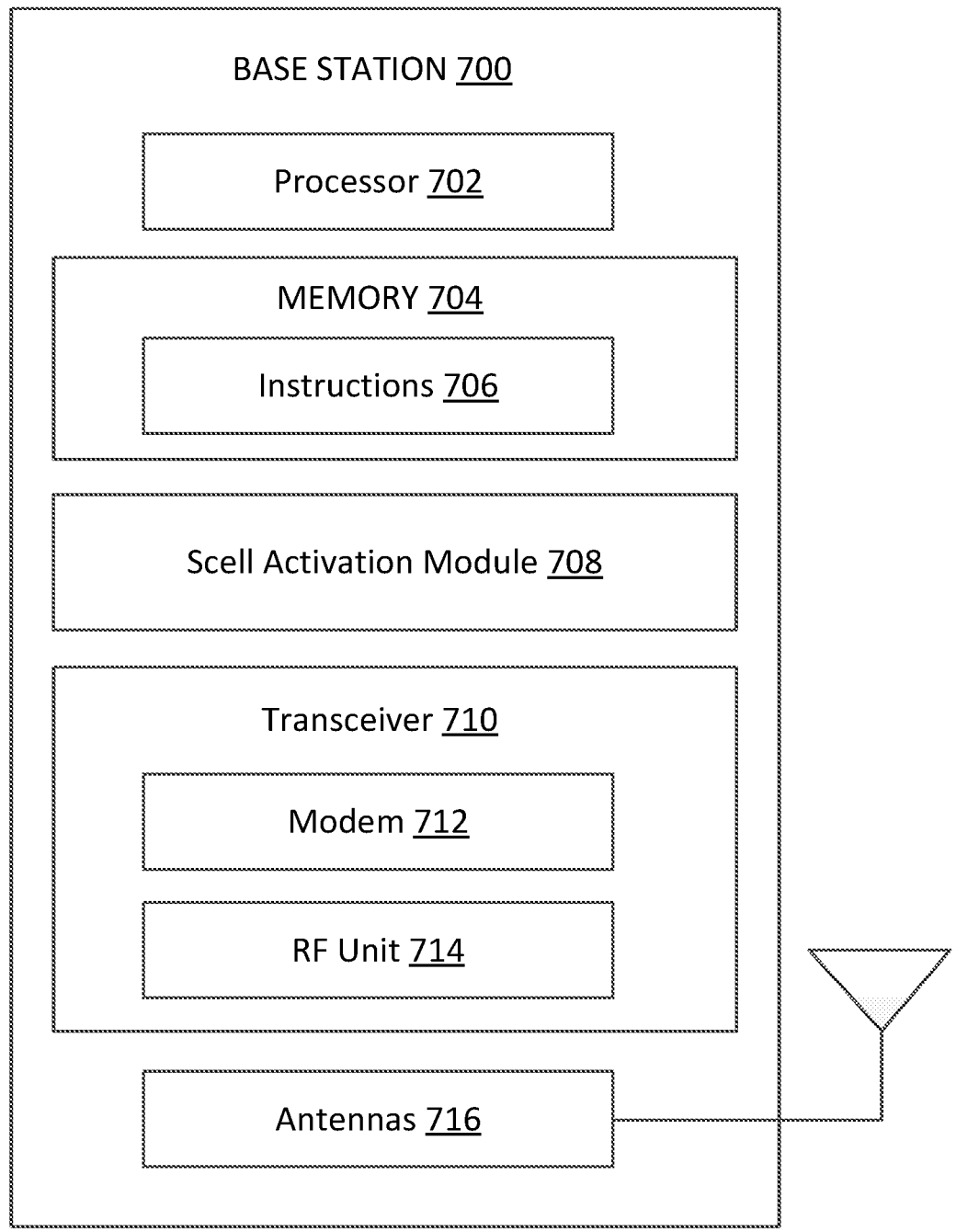
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 in the network 100 as discussed above in FIG. 1. A shown, the BS 700 may include a processor 702, a memory 704, a Scell activation module 708, a transceiver 710 including a modem subsystem 712 and an RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 3-6, 9, and 11. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Scell activation module 708 may be implemented via hardware, software, or combinations thereof. For example, the Scell activation module 708 may be implemented as a processor, circuit, and/or instructions 706 stored in the memory 704 and executed by the processor 702. In some examples, the Scell activation module 708 can be integrated within the modem subsystem 712. For example, the Scell activation module 708 can be implemented by a combination of software components (e.g., executed by a DSP or a general processor) and hardware components (e.g., logic gates and circuitry) within the modem subsystem 712.

The Scell activation module 708 may be used for various aspects of the present disclosure, for example, aspects of FIGS. 3-6, 9, and/or 11. In one aspect, the Scell activation module 708 is configured to receive, from the BS via a first cell, an activation command to activate a second cell different from the first cell. The Scell activation module 708 may be further configured to receive, from the BS via the second cell during an activation period, a first reference signal different from an SSB. The Scell activation module 708 may be further configured to perform a measurement of the first reference signal, and operate in the second cell based on the measurement.

As shown, the transceiver 710 may include the modem subsystem 712 and the RF unit 714. The transceiver 710 can be configured to communicate bi-directionally with other devices, such as the UEs 115 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PDCCH, PDSCH, SSBs, SIB s, initial BWP configurations, PDCCH common configurations, search space configurations) from the modem subsystem 712 (on outbound transmissions) or of transmissions originating from another source such as a UE 115. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., UE capability reports, MSG1, MSG3, ACK/NACK, PUCCH, PUSCH) to the Scell activation module 708 for processing. The antennas 716 may include multiple antennas of similar or different designs in order to sustain multiple transmission links.

In some aspects, the processor 702 is configured to coordinate with the Scell activation module 708 to cause the transceiver 710 to receive, from the BS via a first cell, an activation command to activate a second cell different from the first cell, and cause the transceiver 710 to receive, from the BS via the second cell during an activation period, a first reference signal different from an SSB. The processor 702 may be further configured to perform a measurement of the first reference signal, and operate in the second cell based on the measurement.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
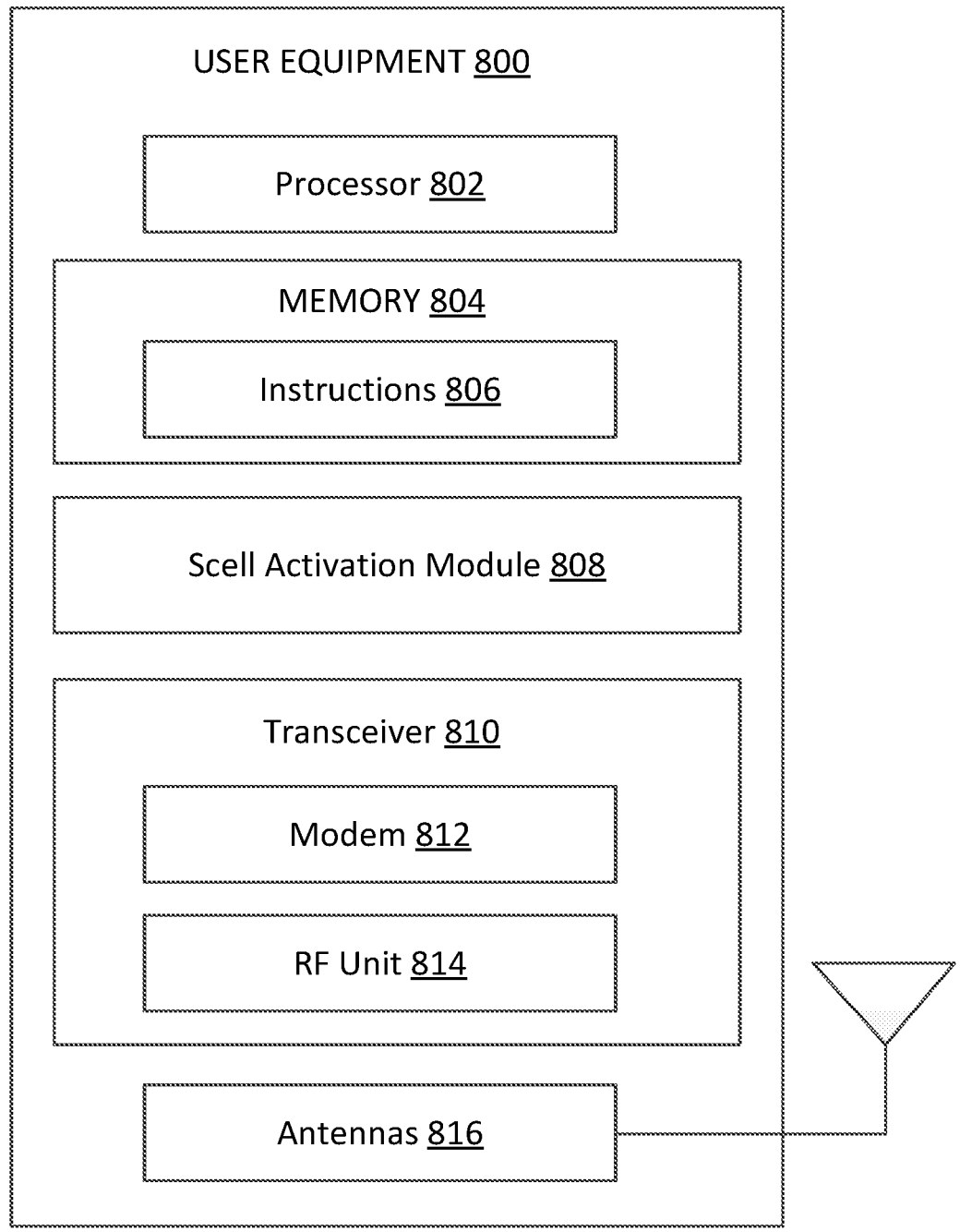
FIG. 8 is a block diagram of an exemplary user equipment (UE) according to some aspects of the present disclosure.

FIG. 8 is a block diagram of an exemplary UE 800 according to some aspects of the present disclosure. The UE 800 may be a UE 115 as discussed above with respect to FIG. 1. As shown, the UE 800 may include a processor 802, a memory 804, a Scell activation module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 3-7, 10, and 11. Instructions 806 may also be referred to as program code, which may be interpreted broadly to include any type of computer-readable statement(s) as discussed above with respect to FIG. 8.

The Scell activation module 808 may be implemented via hardware, software, or combinations thereof. For example, the Scell activation module 808 may be implemented as a processor, circuit, and/or instructions 806 stored in the memory 804 and executed by the processor 802. In some examples, the Scell activation module 808 can be integrated within the modem subsystem 812. For example, the Scell activation module 808 can be implemented by a combination of software components (e.g., executed by a DSP or a general processor) and hardware components (e.g., logic gates and circuitry) within the modem subsystem 812.

The Scell activation module 808 may be used for various aspects of the present disclosure, for example, aspects of FIGS. 3-6, 9, and 10. In one aspect, the Scell activation module 808 is configured to transmit, to a UE via a first cell, an activation command to activate a second cell different from the first cell. The Scell activation module 808 may be further configured to transmit, to the UE via the second cell during an activation period, a first reference signal different from a synchronization signal block (SSB). The Scell activation module 808 may be further configured to receive, from the UE, a measurement report, and operate in the second cell in response to receiving the measurement report.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the Scell activation module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., UE capability report, MSG1, MSG3, ACK/NACK, PUCCH) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may include one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., PDCCH, PDSCH, RRC configuration, SSB, SIB, PDCCH, search space configurations) to the Scell activation module 808 for processing. The antennas 816 may include multiple antennas of similar or different designs in order to sustain multiple transmission links. The RF unit 814 may configure the antennas 816.

In some aspects, the processor 802 is configured to coordinate with the Scell activation module 808 to cause the transceiver 810 to transmit, to a UE via a first cell, an activation command to activate a second cell different from the first cell, and cause the transceiver 810 to transmit, to the UE via the second cell during an activation period, a first reference signal different from a synchronization signal block (SSB). The processor 802 may be further configured to cause the transceiver 810 to receive, from the UE, a measurement report, and operate in the second cell in response to receiving the measurement report.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
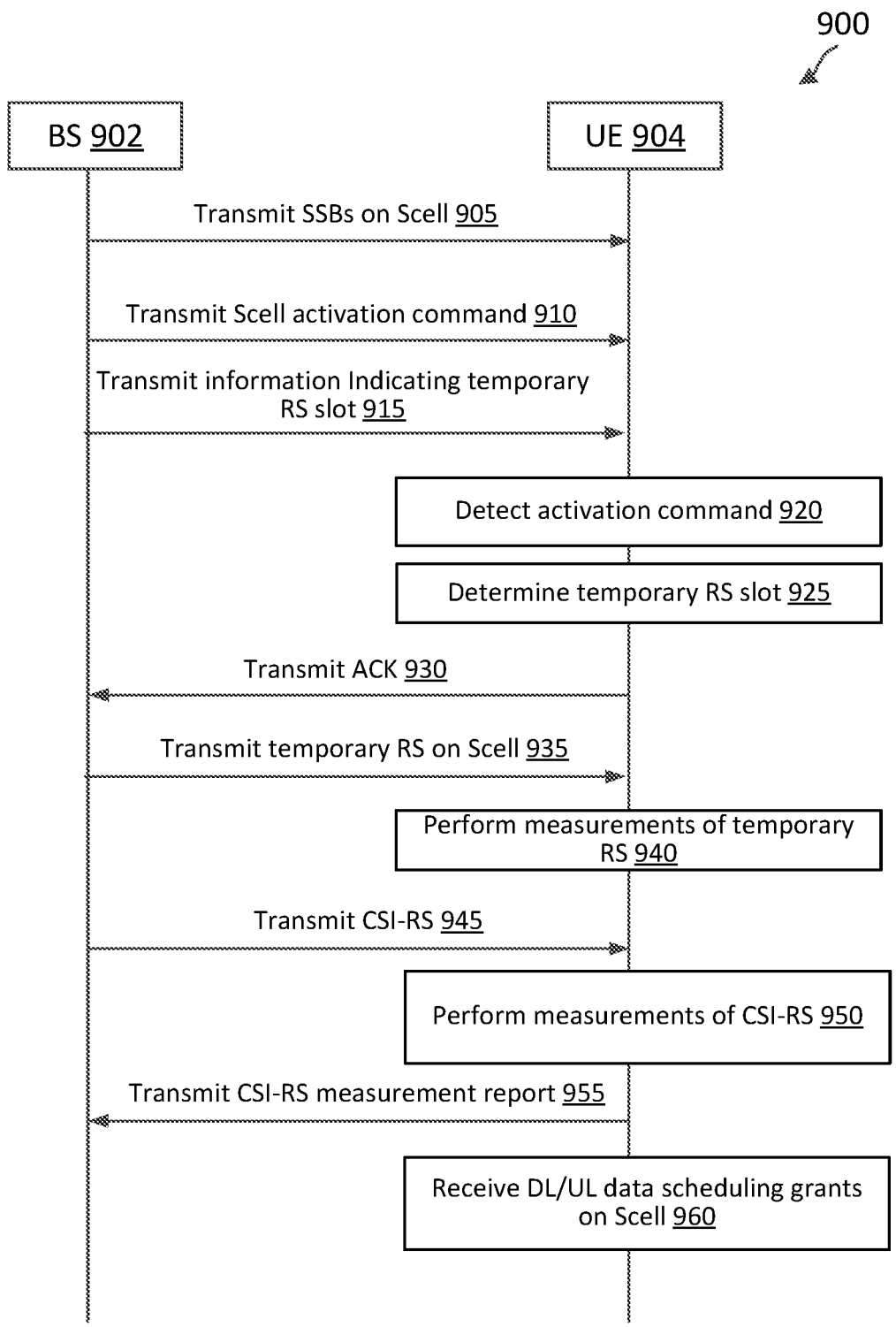
FIG. 9 is a signaling diagram illustrating an Scell activation method according to some aspects of the present disclosure.

FIG. 9 is a signaling diagram illustrating a cross-carrier scheduling method 900 according to some aspects of the present disclosure. The method 900 may be implemented between a BS 902, and a UE 904. The BS 902 may correspond to a BS 105 or a BS 700, and the UE 904 may correspond to a UE 115 or a UE 800. In some instances, the UE 904 may be configured for carrier aggregation (CA) and cell activation. The method 900 may be implemented in conjunction with the schemes 300, 400, 500a-500d, and/or 600, discussed with reference to FIGS. 3-4, 5A-5E, 6. As illustrated, the method 900 includes a number of enumerated actions, but embodiments of the method 900 may include additional actions before, after, and in between the enumerated actions. In some embodiments, one or more of the enumerated actions may be omitted or performed in a different order.

At a high level, a BS in communication with a UE over a Pcell can activate an Scell for CA operations. To activate an Scell in a CA communication scheme, a BS transmits one or more temporary RSs on the Scell to be activated, and indicates, to the UE, the slot(s) in which the one or more temporary RSs is being transmitted. In some instances, the BS may also transmit RSs on a Pcell, for example, when the Pcell and the Scell operate over the same frequency band. The temporary RS may be a TRS, for example, and may be transmitted independent of an SSB schedule periodicity (e.g., between two SSB or SSB bursts), such that the temporary RS can be transmitted before a given SSB. The UE performs one or more measurements and/or detection protocols, such as time/frequency tracking, based on the temporary RS. Based on the measurements, the UE may activate the Scell such that the Scell can be used to schedule DL and/or UL data transmissions.

At action 905, the BS 902 transmits a series of SSBs, or bursts of SSBs, to the UE over the Scell. The BS may transmit the SSBs with an SSB periodicity. For example, the BS may transmit one SSB or SSB burst every 20 ms, 40 ms, 60 ms, 80 ms, 160 ms, or any other suitable time period, both greater or smaller. The slots and periodicity of the SSBs may be fixed, in some aspects. In some instances, the BS 902 may utilize one or more components, such as the processor 702, the memory 704, the Scell activation module 708, the transceiver 710, the modem 712, and the one or more antennas 716, to perform aspects of action 905.

At action 910, the BS transmits an Scell activation command to the UE, for example, over a Pcell. The Scell activation command may be transmitted as a DL data transmission carried by a PDSCH, in some aspects. For example, the Scell activation may be indicated in a MAC-CE carried by a PDSCH. In some instances, the BS 902 may utilize one or more components, such as the processor 702, the memory 704, the Scell activation module 708, the transceiver 710, the modem 712, and the one or more antennas 716, to perform aspects of action 910.

At action 915, the BS transmits information to the UE associated with the triggering of one or more temporary RSs associated with the Scell activation. For example, the information may indicate the slot where the temporary RS is transmitted, the NZP-CSI-RS resource set index associated with the temporary RS, and/or any other suitable information that can be used by the UE to identify and measure the temporary RS. In some aspects, the information may be transmitted in a MAC-CE carried by a PDSCH. For example, the information may be transmitted in the same MAC-CE that carries the Scell activation command transmitted in action 910. In other aspects, the information may be transmitted in a different MAC-CE than the MAC-CE carrying the Scell activation command. In another aspect, the information may be carried in control information, such as DCI. The DCI may be carried by a PDCCH, where the DCI may also schedule the MAC-CE that carries the Scell activation command. In other aspects, the DCI may be a different DCI than the DCI that schedules the MAC-CE carrying the Scell activation command. In some instances, the BS 902 may utilize one or more components, such as the processor 702, the memory 704, the Scell activation module 708, the transceiver 710, the modem 712, and the one or more antennas 716, to perform aspects of action 915. In some aspects, the BS may not trigger the UE with an explicit trigger for the temporary RS, and thus action 915 can be optional. In other words, the transmission of the temporary RS can be an implicit indication based on the BS transmitting the activation command to the UE. In some aspects, the temporary RS can be UE-specific.

At action 920, the UE 904 detects the activation command transmitted in action 910. Detecting the activation command may include decoding the control information (e.g., DCI) scheduling the DL data carrying the Scell activation command in the PDSCH, and then identifying and decoding the DL data carrying the Scell activation command. The Scell activation command may indicate one or more parameters associated with the Scell, such as a frequency range of the Scell, and one or more system configuration parameters associated with the Scell. In some instances, the UE 904 may utilize one or more components, such as the processor 802, the memory 804, the Scell activation module 808, the transceiver 810, the modem 812, and the one or more antennas 816, to perform aspects of action 920.

At action 925, the UE 904 determines, based on the information transmitted in action 915, the slot and/or set of resources (e.g., NZP-CSI-RS resource set index) in which the temporary RS will be transmitted on the Scell. In some instances, the UE 904 may utilize one or more components, such as the processor 802, the memory 804, the Scell activation module 808, the transceiver 810, the modem 812, and the one or more antennas 816, to perform aspects of action 925.

At action 930, the UE 904 transmits, to the BS 902, an ACK in response to the Scell activation command. The ACK may be transmitted according to a HARQ procedure. The delay between receiving the Scell activation command and transmitting the ACK may be referred to as T HARQ. In some instances, the UE 904 may utilize one or more components, such as the processor 802, the memory 804, the Scell activation module 808, the transceiver 810, the modem 812, and the one or more antennas 816, to perform aspects of action 930.

At action 935, the BS 902 transmits, on the Scell, the temporary RS indicated in the information transmitted in action 915. The temporary RS may include, for example, an NZP-CSI-RS, such as a TRS. A TRS may be a NZP-CSI-RS configured for tracking purposes, for example, configured by an NZP-CSI-RS resource set configured with trs_info. In other aspects, the temporary RS may include a -TRS NZP-CSI-RS that is not specifically configured for tracking purpose, for example, configured by an NZP-CSI-RS resource without a trs_info configuration. In some aspects, the temporary RS may include 2 NZP-CSI-RS resources in one slot, or 4 NZP-CSI-RS resources in two consecutive slots. In some aspects, the BS 902 may transmit the temporary RS over the bandwidth of the DL BWP that will be active when the Scell is first activated (e.g., the DL BWP with first-active-DL-BWP-id).

In some aspects, the BS 902 may also transmit one or more of the temporary RSs on the Pcell, for example, when the Pcell and the Scell operate over the same frequency band. For instance, in some wireless communication protocols, SSBs are to be transmitted in all frequency carriers in the same band and in the same slot. Accordingly, he temporary RSs may be transmitted on the Scell and the Pcell in a same slot. In some aspects, all of the temporary RSs transmitted by the BS 902 for the Scell activation are transmitted on both the Scell and the Pcell. In other aspects, only one or some of the temporary RSs transmitted by the BS 902 for the Scell activation are transmitted on both the Scell and the Pcell.

In some aspects, the time period that runs from the time the ACK is transmitted in action 930 to 2 ms after the temporary RS is received at action 935 is referred to as $T_{ActivationTime}$. It will be understood that 2 ms in this instance is exemplary and that other delays may be included in $T_{ActivationTime}$, both greater and smaller. In some instances, the BS 902 may utilize one or more components, such as the processor 702, the memory 704, the Scell activation module 708, the transceiver 710, the modem 712, and the one or more antennas 716, to perform aspects of action 935.

At action 940, the UE 904 performs one or more measurements and/or detection protocols based on the temporary RS. For example, the UE 904 may perform frequency and/or time tracking (e.g., fine tracking), AGC, and/or cell detection based on the temporary RS. The measurement/detection protocols performed based on the temporary RS may depend on UE capabilities, whether the Scell is known to the UE, and the measurement cycle of the Scell. For example, if the Scell was previously activated and known to the UE, and the Scell measurement cycle is equal to or smaller than a threshold duration, such as 160 ms, the UE may perform frequency and/or time tracking only using the temporary RS. In another aspect, if the Scell is known to the UE and the Scell measurement cycle is greater than the threshold duration (e.g., 160 ms), the BS 902 may transmit, and the UE 904 may receive, two or more temporary RSs to perform additional measurements, such as AGC and time/frequency tracking. In another aspect, if the S cell is not known to the UE 904, the 904 may perform one or more of AGC or time/frequency tracking, based on one or more temporary RSs transmitted by the BS 902 and cell detection based on an SSB transmitted by the BS 902 in the Scell. In some aspects, the UE 904 may use a combination of temporary RSs and SSBs transmitted by the BS on the Scell to perform the Scell activation measurement/detection protocols.

As explained above, in some aspects, the UE 904 also performs one or more measurement/detection protocols based on corresponding temporary RSs transmitted on the Pcell. For example, when the Scell and the Pcell are in the same band, one or more of AGC, time/frequency tracking, and/or cell detection may be performed by the UE 904 on the Pcell. In some instances, the UE 904 may utilize one or more components, such as the processor 802, the memory 804, the Scell activation module 808, the transceiver 810, the modem 812, and the one or more antennas 816, to perform aspects of action 940.

At action 945, the BS 902 transmits a CSI-RS to the UE 904 over the Scell. The BS 902 may configure the UE 904 with a CSI-RS resource set and may transmit the CSI-RS using a resource in the CSI_RS resource set. In some instances, the BS 902 may transmit a CSI-RS resource set configuration to the UE 904 over the Pcell. In some instances, the BS 902 may utilize one or more components, such as the processor 702, the memory 704, the Scell activation module 708, the transceiver 710, the modem 712, and the one or more antennas 716, to perform aspects of action 945.

At action 950, the UE 904 performs a measurement of the CSI-RS. In some aspects, the measurements may include reference signal receive power (RSRP), reference signal received quality (RSRQ), channel quality indicator (CQI), precoding matrix indicator (PMI), rank information, and/or the like. In some instances, the UE 904 may utilize one or more components, such as the processor 802, the memory 804, the Scell activation module 808, the transceiver 810, the modem 812, and the one or more antennas 816, to perform aspects of action 950.

At action 955, the UE 904 transmits a CSI-RS measurement report to the BS 902 based on the CSI-RS measurement performed at action 950. The CSI-RS measurement report may include RSRP, RSRQ, CQI, PMI, and/or rank information. The BS 902 may determine transmission parameters for communicating with the UE 904 based on CSI-RS measurement report. The delay from the end of $T_{ActivationTime}$ to the time the CSI-RS report is transmitted may be referred to as $T_{CSIReporting}$. In some aspects, the total delay that includes $T_{HARQ}$, $T_{ActivationTime}$, and $T_{CSIReporting}$ is known as the Scell Activation Delay. In some instances, the UE 904 may utilize one or more components, such as the processor 802, the memory 804, the Scell activation module 808, the transceiver 810, the modem 812, and the one or more antennas 816, to perform aspects of action 955.

At action 960, the UE 904 can receive DL and/or UL data scheduling grants on the activated Scell. In some instances, the UE 904 may utilize one or more components, such as the processor 802, the memory 804, the Scell activation module 808, the transceiver 810, the modem 812, and the one or more antennas 816, to perform aspects of action 955.

Figure 10:
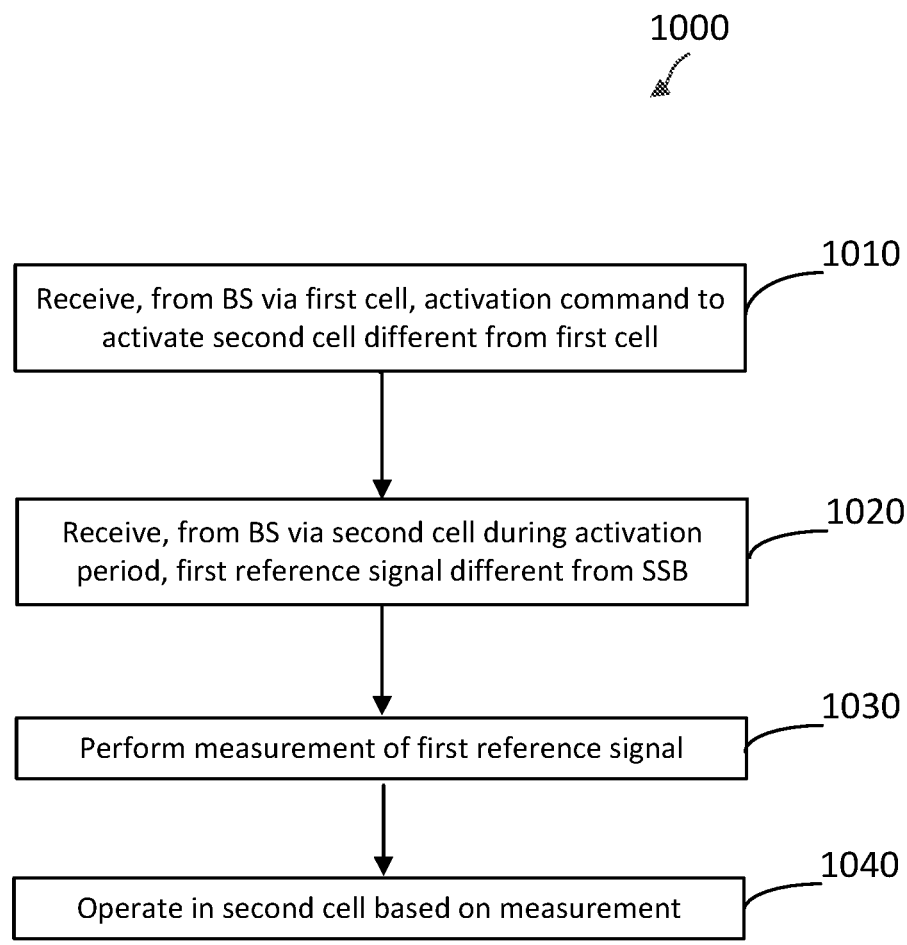
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115, 800, may utilize one or more components, such as the processor 802, the memory 804, the Scell activation module 808, the transceiver 810, the modem 812, and the one or more antennas 816, to execute the steps of method 1000. The method 1000 may employ similar mechanisms as described above in FIGS. 3-10 and 13. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the UE receives, from the BS via a first cell, an activation command to activate a second cell different from the first cell.

At block 1020, the UE receives, from the BS via the second cell during an activation period, a first reference signal different from an SSB. In one aspect, the first reference signal includes a non-zero power (NZP) channel state information reference signal (CSI-RS) resource set. In one aspect, the first reference signal includes a tracking reference signal (TRS).

At block 1030, the UE performs a measurement of the first reference signal. In some aspects, the UE performing the measurement includes the UE performing at least one of a time tracking or a frequency tracking based on the first reference signal.

At block 1040, the UE operates in the second cell based on the measurement. In this regard, the BS may schedule DL and/or UL data on the second cell when the second cell is activated based on the steps of the method 1000.

In some aspects, the method 1000 further comprises the UE receiving, from the BS, control information in a control channel, wherein the control information comprises a configuration of the first reference signal. In some aspects, the control information is associated with downlink data that includes the activation command received by the UE at block 1010. In some aspects, the control information comprises downlink control information (DCI) indicating the configuration of the first reference signal.

In another aspect, the method 1000 further includes the UE receiving, from the BS via the first cell, downlink data in a data channel, wherein the downlink data comprises a configuration of the first reference signal. In some aspects, the downlink data comprises the activation command received by the UE at block 1010. In some aspects, the downlink data comprises a media access control-control element (MAC-CE) indicating the configuration of the first reference signal.

In another aspect, the method 1000 further includes the UE receiving, from the BS via the second cell during the activation period, a second reference signal different from the first reference signal. In some aspects, the method 1000 further includes transmitting, to the BS, a capability report. In some aspects, the first reference signal and the second reference signal are spaced apart by a time period that is based on the capability report. In some aspects, the UE performing the measurement at block 1030 includes the UE performing automatic gain control (AGC) based on the first reference signal, and performing at least one of a time tracking or a frequency tracking based on the second reference signal. In some aspects, the UE receiving the first reference signal at block 1020 includes the UE receiving the first reference signal in a first slot. In some aspects, the UE receiving the second reference signal includes the UE receiving the second reference signal in a second slot consecutive with the first slot. In some aspects, the UE receiving the first reference signal at block 1020 includes the UE receiving the first reference signal in a first slot. In some aspects, the UE receiving the second reference signal includes the UE receiving the second reference signal in a second slot non-consecutive with the first slot. In some aspects, the UE receiving the first reference signal at block 1020 includes the UE receiving the first reference signal in a first slot, and the UE receiving the second reference signal includes the UE receiving the second reference signal in the first slot. In some aspects, the UE receiving the second reference signal includes receiving an SSB. In some aspects, the receiving the first reference signal at block 1020 includes the UE receiving, from the BS via the first cell, the first reference signal based on the second cell being in a same frequency band as the first cell. In some aspects, the method 1000 further includes the UE receiving, from the BS via the first cell, the second reference signal based on the second cell being in a same frequency band as the first cell.

In some aspects, the method 1000 further includes the UE receiving, from the BS via the second cell during the activation period, an SSB, and performing a cell detection based on the SSB. In one aspect, the method 1000 further includes the UE transmitting, to the BS, a measurement report based on the measurement of the first reference signal. In another aspect, the method 1000 further includes the UE transmitting, to the BS in response to receiving the activation command, an acknowledgement signal. In some aspects, the UE receiving the first reference signal at block 1020 includes the UE receiving the first reference signal after transmitting the acknowledgement signal.

Figure 11:
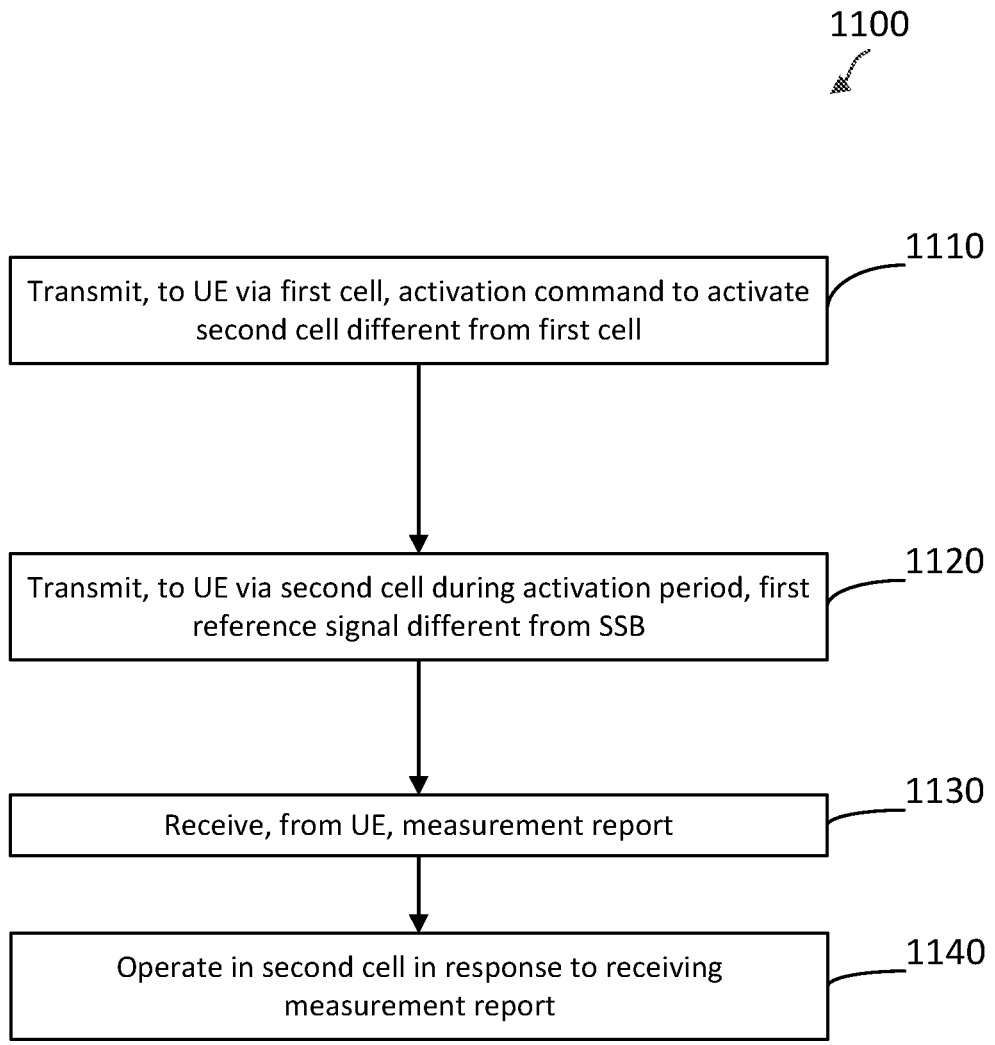
FIG. 11 is a flow diagram of a wireless communication method according to some aspects of the present disclosure.

FIG. 11 is a flow diagram of a wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BSs 105, 700, may utilize one or more components, such as the processor 702, the memory 704, the Scell activation module 708, the transceiver 710, the modem 712, and the one or more antennas 716, to execute the steps of method 1100. The method 1100 may employ similar mechanisms as described above in FIGS. 3-10 and 13. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the BS transmits, to a UE via a first cell, an activation command to activate a second cell different from the first cell.

At block 1120, the BS transmits, to the UE via the second cell during an activation period, a first reference signal different from a synchronization signal block (SSB). In some aspects, the first reference signal includes a non-zero power (NZP) channel state information reference signal (CSI-RS) resource set. In some aspects, the first reference signal includes a tracking reference signal (TRS).

At block 1130, the BS receives, from the UE, a measurement report. In one aspect, the measurement report includes a channel state information (CSI) report.

At block 1140, the BS operates in the second cell in response to receiving the measurement report.

In some aspects, the method 1100 further includes the BS transmitting, to the UE via the first cell, control information in a control channel. In some aspects, the control information comprises a configuration of the first reference signal. In some aspects, the control information is associated with downlink data comprising the activation command. In some aspects, the control information includes downlink control information (DCI) indicating the configuration of the first reference signal.

In some aspects, the method 1100 further includes the BS transmitting, to the UE via the first cell, downlink data in a data channel. In some aspects, the downlink data includes a configuration of the first reference signal. In some aspects, the downlink data includes the activation command transmitted at block 1110. In some aspects, the downlink data includes a media access control-control element (MAC-CE) indicating the configuration of the first reference signal.

In some aspects, the method 1100 further includes the BS transmitting, to the UE via the second cell during the delay period, a second reference signal different from the first reference signal. In some aspects, the method 1100 further includes the BS receiving, from the UE, a capability report. In some aspects, the first reference signal and the second reference signal are spaced apart by a time period that is based on the capability report. In some aspects, the BS transmitting the first reference signal at block 1120 includes the BS transmitting the first reference signal in a first slot, and the BS transmitting the second reference signal includes the BS transmitting the second reference signal in a second slot consecutive with the first slot. In some aspects, the BS transmitting the first reference signal at block 1120 includes the BS transmitting the first reference signal in a first slot, and the BS transmitting the second reference signal includes the BS transmitting the second reference signal in a second slot non-consecutive with the first slot. In some aspects, the BS transmitting the first reference signal at block 1120 includes the BS transmitting the first reference signal in a first slot, and the BS transmitting the second reference signal includes the BS transmitting the second reference signal in the first slot. In some aspects, the BS transmitting the second reference signal includes the BS transmitting a synchronization signal block (SSB). In another aspect, the BS transmitting the first reference signal at block 1120 includes the BS transmitting, to the UE via the first cell, the first reference signal based on the second cell being in a same frequency band as the first cell. In some aspects, the method 1100 further includes the BS transmitting, to the UE via the first cell, the second reference signal based on the second cell being a same frequency band as the first cell.

In some aspects, the method 1100 further comprises the BS transmitting, to the UE via the second cell during the activation period, an SSB. In some aspects, the method 1100 further includes the BS receiving, from the UE based on the transmitting the activation command, an acknowledgement signal.

EXAMPLE ASPECTS OF THE PRESENT DISCLOSURE

Aspect 1. A method of wireless communication performed by a user equipment (UE), comprising: receiving, from a base station (BS) via a first cell, an activation command to activate a second cell different from the first cell; receiving, from the BS via the second cell during an activation period, a first reference signal different from a synchronization signal block (SSB); performing a measurement of the first reference signal; and operating in the second cell based on the measurement.

Aspect 2. The method of aspect 1, further comprising: receiving, from the BS via the first cell, control information in a control channel, wherein the control information comprises a configuration of the first reference signal.

Aspect 3. The method of aspect 2, wherein the control information is associated with downlink data comprising the activation command.

Aspect 4. The method of aspect 2, wherein the control information comprises downlink control information (DCI) indicating the configuration of the first reference signal.

Aspect 5. The method of any of aspects 1-4, further comprising: receiving, from the BS via the first cell, downlink data in a data channel, wherein the downlink data comprises a configuration of the first reference signal.

Aspect 6. The method of aspect 5, wherein the downlink data comprises the activation command.

Aspect 7. The method of aspect 5, wherein the downlink data comprises a media access control-control element (MAC-CE) indicating the configuration of the first reference signal.

Aspect 8. The method of any of aspects 1-7, wherein the performing the measurement comprises: performing at least one of a time tracking or a frequency tracking based on the first reference signal.

Aspect 9. The method of any of aspects 1-8, further comprising: receiving, from the BS via the second cell during the activation period, a second reference signal different from the first reference signal.

Aspect 10. The method of aspect 9, further comprising: transmitting, to the BS, a capability report, wherein the first reference signal and the second reference signal are spaced apart by a time period that is based on the capability report.

Aspect 11. The method of aspect 9, wherein the performing the measurement comprises: performing automatic gain control (AGC) based on the first reference signal; and performing at least one of a time tracking or a frequency tracking based on the second reference signal.

Aspect 12. The method of aspect 11, wherein the receiving the first reference signal comprises receiving the first reference signal in a first slot, and wherein the receiving the second reference signal comprises receiving the second reference signal in a second slot consecutive with the first slot.

Aspect 13. The method of aspect 11, wherein the receiving the first reference signal comprises receiving the first reference signal in a first slot, and wherein the receiving the second reference signal comprises receiving the second reference signal in a second slot non-consecutive with the first slot.

Aspect 14. The method of aspect 11, wherein the receiving the first reference signal comprises receiving the first reference signal in a first slot, and wherein the receiving the second reference signal comprises receiving the second reference signal in the first slot.

Aspect 15. The method of aspect 11, wherein the receiving the second reference signal comprises: receiving a synchronization signal block (SSB).

Aspect 16. The method of aspect 11, wherein the receiving the first reference signal comprises: receiving, from the BS via the first cell, the first reference signal based on the second cell being in a same frequency band as the first cell.

Aspect 17. The method of aspect 16, further comprising: receiving, from the BS via the first cell, the second reference signal based on the second cell being in a same frequency band as the first cell.

Aspect 18. The method of any of aspects 1-17, further comprising: receiving, from the BS via the second cell during the activation period, an SSB; and performing a cell detection based on the SSB.

Aspect 19. The method of any of aspects 1-18, wherein the first reference signal comprises a non-zero power (NZP) channel state information reference signal (CSI-RS) resource set.

Aspect 20. The method of any of aspects 1-18, wherein the first reference signal comprises a tracking reference signal (TRS).

Aspect 21. The method of any of aspects 1-20, further comprising: transmitting, to the BS, a measurement report based on the measurement of the first reference signal.

Aspect 22. The method of any of aspects 1-21, further comprising: transmitting, to the BS in response to receiving the activation command, an acknowledgement signal, wherein the receiving the first reference signal comprises receiving the first reference signal after transmitting the acknowledgment signal.

Aspect 23. A method of wireless communication performed by a base station (BS), the method comprising: transmitting, to a user equipment (UE) via a first cell, an activation command to activate a second cell different from the first cell; transmitting, to the UE via the second cell during an activation period, a first reference signal different from a synchronization signal block (SSB); receiving, from the UE, a measurement report; and operating in the second cell in response to receiving the measurement report.

Aspect 24. The method of aspect 23, further comprising: transmitting, to the UE via the first cell, control information in a control channel, wherein the control information comprises a configuration of the first reference signal.

Aspect 25. The method of aspect 24, wherein the control information is associated with downlink data comprising the activation command.

Aspect 26. The method of aspect 24, wherein the control information comprises downlink control information (DCI) indicating the configuration of the first reference signal.

Aspect 27. The method of any of aspects 23-26, further comprising: transmitting, to the UE via the first cell, downlink data in a data channel, wherein the downlink data comprises a configuration of the first reference signal.

Aspect 28. The method of aspect 27, wherein the downlink data comprises the activation command.

Aspect 29. The method of aspect 27, wherein the downlink data comprises a media access control-control element (MAC-CE) indicating the configuration of the first reference signal.

Aspect 30. The method of any of aspects 23-29, wherein the measurement report comprises a channel state information (CSI) report.

Aspect 31. The method of any of aspects 23-30, further comprising: transmitting, to the UE via the second cell during the activation period, a second reference signal different from the first reference signal.

Aspect 32. The method of aspect 31, further comprising: receiving, from the UE, a capability report, wherein the first reference signal and the second reference signal are spaced apart by a time period that is based on the capability report.

Aspect 33. The method of any of aspects 31-32, wherein the transmitting the first reference signal comprises transmitting the first reference signal in a first slot, and wherein the transmitting the second reference signal comprises transmitting the second reference signal a second slot consecutive with the first slot.

Aspect 34. The method of any of aspects 31-32, wherein the transmitting the first reference signal comprises transmitting the first reference signal in a first slot, and wherein the transmitting the second reference signal comprises transmitting the second reference signal a second slot non-consecutive with the first slot.

Aspect 35. The method of any of aspects 31-32, wherein the transmitting the first reference signal comprises transmitting the first reference signal in a first slot, and wherein the transmitting the second references signal comprises transmitting the second reference signal in the first slot.

Aspect 36. The method of any of aspects 31-35, wherein the transmitting the second reference signal comprises: transmitting a synchronization signal block (SSB).

Aspect 37. The method of any of aspects 31-36, wherein the transmitting the first reference signal comprises: transmitting, to the UE via the first cell, the first reference signal based on the second cell being in a same frequency band as the first cell.

Aspect 38. The method of aspect 37, further comprising: transmitting, to the UE via the first cell, the second reference signal based on the second cell being in a same frequency band as the first cell.

Aspect 39. The method of any of aspects 23-38, further comprising: transmitting, to the UE via the second cell during the activation period, an SSB.

Aspect 40. The method of any of aspects 23-39, wherein the first reference signal is a non-zero power (NZP) channel state information reference signal (CSI-RS) resource set.

Aspect 41. The method of any of aspects 23-39, wherein the first reference signal comprises a tracking reference signal (TRS).

Aspect 42. The method of any of aspects 23-41, further comprising: receiving, from the UE based on the transmitting the activation command, an acknowledgement signal.

A user equipment (UE) comprising a processor and a transceiver configured to perform the steps of any of aspects 1-22.

A base station (BS) comprising a processor and a transceiver configured to perform the steps of any of aspects 23-42.

A non-transitory, computer-readable medium having program code recorded thereon, wherein the program code comprises instructions executable by a user equipment (UE) to cause the UE to perform the steps of any of aspects 1-22.

A non-transitory, computer-readable medium having program code recorded thereon, wherein the program code comprises instructions executable by a base station (BS) to cause the BS to perform the steps of any of aspects 23-42.

A user equipment (UE) comprising means for performing the steps of any of aspects 1-22.

A base station (BS) comprising means for performing the steps of any of aspects 23-42.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A user equipment (UE), comprising:
a transceiver and a processor in communication with the transceiver, wherein the UE is configured to:
receive, in a physical downlink shared channel (PDSCH) via a first cell, an activation command for a second cell different from the first cell; and
receive, via the second cell, a first channel state information reference signal (CSI-RS);
perform tracking on the first CSI-RS; and
transmit a CSI report in the second cell based on the tracking.

2. The UE of claim 1, wherein the UE is further configured to:
receive, via the first cell, control information in a control channel, wherein the control information comprises a configuration of the first CSI-RS.

3. The UE of claim 2, wherein the control information is associated with downlink data comprising the activation command.

4. The UE of claim 2, wherein the control information comprises downlink control information (DCI) indicating the configuration of the first CSI-RS.

5. The UE of claim 1, wherein the UE is further configured to:
receive, via the first cell, downlink data, wherein the downlink data comprises a configuration of the first CSI-RS.

6. The UE of claim 5, wherein the downlink data comprises the activation command.

7. The UE of claim 5, wherein the downlink data comprises a media access control-control element (MAC-CE) indicating the configuration of the first CSI-RS.

8. The UE of claim 1, wherein the UE configured to perform the tracking comprises the UE configured to:
perform at least one of a time tracking or a frequency tracking based on the first CSI-RS.

9. The UE of claim 1, wherein the UE is further configured to:
receive, via the second cell during an activation period, a second reference signal different from the first CSI-RS.

10. The UE of claim 9, wherein the UE is further configured to:
transmit, a capability report, wherein the first CSI-RS and the second reference signal are spaced apart by a time period that is based on the capability report.

11. The UE of claim 9, wherein the UE configured to perform the tracking comprises the UE configured to:
perform automatic gain control (AGC) based on the first CSI-RS; and
perform at least one of a time tracking or a frequency tracking based on the second reference signal.

12. The UE of claim 11, wherein the UE configured to receive the first CSI-RS comprises the UE configured to receive the first CSI-RS in a first slot, and wherein the UE configured to receive the second reference signal comprises the UE configured to receive the second reference signal in a second slot consecutive with the first slot.

13. The UE of claim 11, wherein the UE configured to receive the first CSI-RS comprises the UE configured to receive the first CSI-RS in a first slot, and wherein the UE configured to receive the second reference signal comprises the UE configured to receive the second reference signal in a second slot non-consecutive with the first slot.

14. The UE of claim 11, wherein the UE configured to receive the first CSI-RS comprises the UE configured to receive the first CSI-RS in a first slot, and wherein the UE configured to receive the second reference signal comprises the UE configured to receive the second reference signal in the first slot.

15. The UE of claim 11, wherein the UE configured to receive the second reference signal comprises:
the UE configured to receive a synchronization signal block (SSB).

16. The UE of claim 11, wherein the UE configured to receive the first CSI-RS comprises the UE configured to:
receive, via the first cell, the first CSI-RS based on the second cell being in a same frequency band as the first cell.

17. The UE of claim 16, wherein the UE is further configured to:
receive, via the first cell, the second reference signal based on the second cell being in a same frequency band as the first cell.

18. The UE of claim 1, wherein the UE is further configured to:
receive, via the second cell during an activation period, an SSB; and perform a cell detection based on the SSB.

19. The UE of claim 1, wherein the first CSI-RS comprises a non-zero power (NZP) CSI-RS resource set.

20. The UE of claim 1, wherein the UE is further configured to:
transmit, in response to receiving the activation command, an acknowledgement signal, wherein the UE configured to receive the first CSI-RS comprises the UE configured to receive the first CSI-RS after transmitting the acknowledgment signal.

21. A method of wireless communication performed by a user equipment (UE), comprising:
receiving, in a physical downlink shared channel (PDSCH) via a first cell, an activation command for a second cell different from the first cell;
receiving, via the second cell, a first channel state information reference signal (CSI-RS);
performing tracking on the first CSI-RS; and
transmitting a CSI report in the second cell based on the tracking.

22. The method of claim 21, further comprising:
receiving, via the first cell, downlink control information (DCI) in a control channel, wherein the DCI is associated with downlink data comprising the activation command, and wherein the DCI indicates a configuration of the first CSI-RS.

23. The method of claim 21, further comprising:
receiving, via the first cell, downlink data comprising the activation command, and wherein the downlink data comprises a media access control-control element (MAC-CE) indicating a configuration of the first CSI-RS.

24. The method of claim 21, wherein the first CSI-RS comprises a non-zero power (NZP) CSI-RS resource set.

25. The method of claim 21, further comprising:
transmitting, in response to receiving the activation command, an acknowledgement signal, wherein the receiving the first CSI-RS comprises receiving the first CSI-RS after transmitting the acknowledgment signal.

26. A non-transitory computer-readable medium having program code recorded thereon, the program code comprising:
- code for causing a UE to receive, in a physical downlink shared channel (PDSCH) via a first cell, an activation command for a second cell different from the first cell;
- code for causing the UE to receive, via the second cell, a first channel state information reference signal (CSI-RS); and
- code for causing the UE to perform tracking on the first CSI-RS;
- code for causing the UE to transmit a CSI report in the second cell based on the tracking.

27. A user equipment (UE), comprising:
- means for receiving, in a physical downlink shared channel (PDSCH) via a first cell, an activation command for a second cell different from the first cell;
- means for receiving, via the second cell, a first channel state information reference signal (CSI-RS);
- means for performing tracking on the first CSI-RS; and
- means for transmitting a CSI report in the second cell based on the tracking.

\* \* \* \* \*